United States Patent
Hawilo et al.

(10) Patent No.: US 10,810,642 B1
(45) Date of Patent: Oct. 20, 2020

(54) METHOD, MANUFACTURE, AND APPARATUS FOR FACILITATING ON-DEMAND HOME AND AUTO SERVICES

(71) Applicant: Groupon, Inc., Chicago, IL (US)

(72) Inventors: Joseph Anthony Hawilo, Chicago, IL (US); Natalia Mozol, Chicago, IL (US); Adam Hotz, Chicago, IL (US); Weihua Wang, Chicago, IL (US); Florent Bonomo, Chicago, IL (US)

(73) Assignee: Groupon, Inc., Chicago, IL (US)

( * ) Notice: Subject to any disclaimer, the term of this patent is extended or adjusted under 35 U.S.C. 154(b) by 764 days.

(21) Appl. No.: 15/280,580

(22) Filed: Sep. 29, 2016

Related U.S. Application Data

(60) Provisional application No. 62/235,110, filed on Sep. 30, 2015.

(51) Int. Cl.
*G06Q 30/00* (2012.01)
*G06Q 30/06* (2012.01)

(52) U.S. Cl.
CPC ......... *G06Q 30/0611* (2013.01); *G06Q 30/06* (2013.01); *G06Q 30/0601* (2013.01); *G06Q 30/0613* (2013.01); *G06Q 30/0619* (2013.01); *G06Q 30/0625* (2013.01); *G06Q 30/0637* (2013.01); *G06Q 30/0639* (2013.01); *G06Q 30/0641* (2013.01)

(58) Field of Classification Search
CPC ................. G06Q 30/0601–0645; G06Q 30/08
USPC ................................................ 705/26.1–27.2
See application file for complete search history.

(56) References Cited

U.S. PATENT DOCUMENTS

| | | |
|---|---|---|
| 8,355,948 B2 | 1/2013 | Mason |
| 9,582,145 B2 | 2/2017 | Gomez-Rosado et al. |
| 9,665,240 B2 | 5/2017 | Gomez Rosado et al. |
| 9,804,737 B2 | 10/2017 | Gomez-Rosado et al. |

(Continued)

OTHER PUBLICATIONS

Nagy, Evie, Thumbtack is coming for yelp and angie's list as the smartest way to hire skilled pros, May 22, 2014, Fastcompany.com, accessed at [https://www.fastcompany.com/3030952/thumbtack-is-coming-for-yelp-and-angies-list-as-the-smartest-way-to-hire-professio] (Year: 2014).*

(Continued)

*Primary Examiner* — Jeffrey A. Smith
*Assistant Examiner* — Lindsey B Smith
(74) *Attorney, Agent, or Firm* — Alston & Bird LLP

(57) ABSTRACT

Various methods are provided for programmatically providing a platform for requesting on-demand services on a consumer device. One example method may comprise receiving a job request, the job request comprising job request parameters, the job request parameters comprising at least a type of service, a location, and a time frame, identifying one or more merchants able to provide the service in accordance with the job request parameters by determining a subset of the plurality of merchants able to provide the service, at the location, within the time frame, causing transmission of a job offer to at least a first merchant of the subset of one or more merchants identified as able to provide the service in accordance with the job request parameters, receiving at least one response, the at least one response from the first merchant from the one or more merchants, and assigning the job to the first merchant.

27 Claims, 7 Drawing Sheets

(56) References Cited

U.S. PATENT DOCUMENTS

| | | | |
|---|---|---|---|
| 2007/0118435 A1* | 5/2007 | Ran | G06Q 30/08 |
| | | | 705/7.36 |
| 2011/0099040 A1* | 4/2011 | Felt | G06Q 10/0631 |
| | | | 705/7.12 |
| 2013/0268406 A1* | 10/2013 | Radhakrishnan | G06Q 30/0283 |
| | | | 705/26.61 |
| 2014/0379530 A1* | 12/2014 | Kim | G07F 17/20 |
| | | | 705/26.81 |
| 2015/0213545 A1 | 7/2015 | Gomez-Rosado et al. | |
| 2015/0213546 A1 | 7/2015 | Gomez-Rosado et al. | |

OTHER PUBLICATIONS

In re: O'Brien; U.S. Application titled Relevance System for Consumer Deals; U.S. Appl. No. 13/411,502, filed Mar. 2, 2012.
In re: Gomez-Rosado; U.S. Application titled Living User Interface; U.S. Appl. No. 61/932,046, filed Jan. 27, 2014.
In re: Aggarwal; U.S. Application titled Promotion Offering System; U.S. Appl. No. 13/829,581, filed Mar. 14, 2013.

* cited by examiner

FIG. 4 – Exemplary Physical Design

FIG. 5 – Exemplary Logical Design

US 10,810,642 B1

METHOD, MANUFACTURE, AND APPARATUS FOR FACILITATING ON-DEMAND HOME AND AUTO SERVICES

CROSS REFERENCES TO RELATED APPLICATIONS

This application claims the benefit of U.S. Provisional Patent Application No. 62/235,110, filed on Sep. 30, 2015, the entire contents of which are incorporated herein by reference.

TECHNOLOGICAL FIELD

Example embodiments of the present invention relate generally to facilitating on-demand home and auto services and, more particularly, to methods, systems, and apparatuses for identifying particular merchants able to provide requested services and facilitating the transaction details.

BACKGROUND

With an increasing number of people utilizing smart phones, not only in their personal life, but for increasing work productivity, an on-demand economy is quickly developing. Strangers now have direct access to consumers to offer services outside the conventional corporate or governmental structure. For example, instead of calling a taxi or searching for a hotel, consumers have other choices. However, many services are too personal or important to rely on strangers. For example, many consumers do not want unknown, unverified, or uninsured strangers to clean their home, watch their kids, repair their car, etc. because of the risks, both for safety and legal reasons. However, there is no reason why the same on-demand responsiveness should elude those consumers. The applicant has discovered problems with current methods, systems, and apparatuses for enabling consumers to engage merchants to provide a service. Through applied effort, ingenuity, and innovation, Applicant has solved many of these identified problems by developing a solution that is embodied by the present invention, which is described in detail below.

BRIEF SUMMARY

Accordingly, a method, apparatus, and computer program product are provided for facilitating on-demand home and auto services and, more particularly, for identifying particular merchants able to provide request services and facilitating the transaction details.

In some embodiments, a method may be provided for programmatically providing a platform for requesting on-demand services on a consumer device, the method comprising receiving a job request, the job request indicative of a job to be performed for a consumer, the job request comprising of job request parameters, the job request parameters comprising at least a type of service, a location, and a time frame, identifying one or more merchants able to provide the service in accordance with the job request parameters, the identification of the one or more merchants including accessing a merchant database, the merchant database including information related to each of a plurality of merchants, and determining a subset of the plurality of merchants able to provide the service, at the location, within the time frame, causing transmission of a job offer to at least a first merchant of the subset of one or more merchants identified as able to provide the service in accordance with the job request parameters, receiving at least one response, the at least one response from the first merchant from the one or more merchants, and assigning the job to the first merchant.

In some embodiments, the method may further comprise causing transmission of a job offer to the subset of one or more merchants identified as able to provide the service in accordance with the job request parameters, and subsequent to the transmission of the job offer, awaiting a predefined amount of time for each of a plurality of responses, and identifying a ranking associated with the merchant providing each of the plurality of responses, wherein the first merchant is the merchant having the highest ranking.

In some embodiments, the method may further comprise causing transmission of a job offer to the subset of one or more merchants identified as able to provide the service in accordance with the job request parameters, and subsequent to the transmission of the job offer, assigning the job to the first merchant to respond.

In some embodiments, the method may further comprise providing notification to the first merchant, the notification indicative of the assignment of the job, and receiving field worker information from the first merchant, the field worker information indicative of one or more field workers tasked with completing the job.

In some embodiments, the method may further comprise causing identification, to the consumer device, of the merchant and the one or more field workers.

In some embodiments, the method may further comprise enabling communication directly to a field worker device, the field worker device operated by at least one of the one or more field workers tasked with completing the job, wherein the enabled communication allowing the field worker device to transmit job-related information and job-related updates.

In some embodiments, the method may further comprise receiving a notice of completion from the field worker device, providing the notice of completion to the consumer device, requesting a payment, receiving payment and feedback information, the feedback information related to a performance of the first merchant and the one or more field workers, and providing variable compensation to the first merchant and the one more field workers, the variable compensation being a portion of the payment, the portion being dependent on the feedback.

In some embodiments, the method may further comprise subsequent to receiving the job request, calculating an estimate price based on the job request parameters, causing transmission of the estimate prices to the consumer device, and awaiting confirmation before proceeding to the identification of the one or more merchants.

In some embodiments, the method may further comprise, subsequent to receiving the job request and identification of the one or more merchants able to provide the service in accordance with the job request parameters, calculating an estimate price based on the job request parameters and the first merchant of the subset of one or more merchants identified as able to provide the service in accordance with the job request parameters, and causing transmission of the estimate prices to the consumer device, and awaiting confirmation before proceeding to the transmission of the job offer.

In some embodiments, the method may further comprise receiving a notice of completion from the field worker device, in an instance in which completion is confirmed via visual inspection, receiving image data indicative of completion, causing examination of the image data to confirm completion, and providing the notice of completion to the consumer device.

In some embodiments, the identification of the of the one or more merchants further comprises preceding the determination of the subset of the plurality of merchants able to provide the service, at the location, within the time frame, calculating a relevance score for each of the one or more merchants, and identifying at least the first merchant, the first merchant having a highest relevance score.

In some embodiments, an apparatus may be provided, the apparatus comprising at least one processor and at least one memory including computer program code, the at least one memory and the computer program code configured to, with the processor, cause the apparatus to at least receive a job request, the job request indicative of a job to be performed for a consumer, the job request comprising of job request parameters, the job request parameters comprising at least a type of service, a location, and a time frame, identify one or more merchants able to provide the service in accordance with the job request parameters, the identification of the one or more merchants including accessing a merchant database, the merchant database including information related to each of a plurality of merchants, and determining a subset of the plurality of merchants able to provide the service, at the location, within the time frame, cause transmission of a job offer to at least a first merchant of the subset of one or more merchants identified as able to provide the service in accordance with the job request parameters, receive at least one response, the at least one response from the first merchant from the one or more merchants, and assigning the job to the first merchant.

In some embodiments, the at least one memory and the computer program code are further configured to, with the processor, cause the apparatus to cause transmission of a job offer to the subset of one or more merchants identified as able to provide the service in accordance with the job request parameters, and subsequent to the transmission of the job offer, await a predefined amount of time for each of a plurality of responses, and identify a ranking associated with the merchant providing each of the plurality of responses, wherein the first merchant is the merchant having the highest ranking.

In some embodiments, the at least one memory and the computer program code are further configured to, with the processor, cause the apparatus to cause transmission of a job offer to the subset of one or more merchants identified as able to provide the service in accordance with the job request parameters, and subsequent to the transmission of the job offer, assign the job to the first merchant to respond.

In some embodiments, the at least one memory and the computer program code are further configured to, with the processor, cause the apparatus to provide notification to the first merchant, the notification indicative of the assignment of the job, and receive field worker information from the first merchant, the field worker information indicative of one or more field workers tasked with completing the job.

In some embodiments, the at least one memory and the computer program code are further configured to, with the processor, cause the apparatus to cause identification, to the consumer device, of the merchant and the one or more field workers.

In some embodiments, the at least one memory and the computer program code are further configured to, with the processor, cause the apparatus to enable communication directly to a field worker device, the field worker device operated by at least one of the one or more field workers tasked with completing the job, wherein the enabled communication allowing the field worker device to transmit job-related information and job-related updates.

In some embodiments, the at least one memory and the computer program code are further configured to, with the processor, cause the apparatus to receive a notice of completion from the field worker device, provide the notice of completion to the consumer device, request a payment, receive payment and feedback information, the feedback information related to a performance of the first merchant and the one or more field workers, and provide variable compensation to the first merchant and the one more field workers, the variable compensation being a portion of the payment, the portion being dependent on the feedback.

In some embodiments, the at least one memory and the computer program code are further configured to, with the processor, cause the apparatus to subsequent to receiving the job request, calculating an estimate price based on the job request parameters, cause transmission of the estimate prices to the consumer device, and await confirmation before proceeding to the identification of the one or more merchants.

In some embodiments, the at least one memory and the computer program code are further configured to, with the processor, cause the apparatus to subsequent to receiving the job request and identification of the one or more merchants able to provide the service in accordance with the job request parameters, calculate an estimate price based on the job request parameters and the first merchant of the subset of one or more merchants identified as able to provide the service in accordance with the job request parameters, and cause transmission of the estimate prices to the consumer device, and await confirmation before proceeding to the transmission of the job offer.

In some embodiments, the at least one memory and the computer program code are further configured to, with the processor, cause the apparatus to receive a notice of completion from the field worker device, in an instance in which completion is confirmed via visual inspection, receive image data indicative of completion, cause examination of the image data to confirm completion, and provide the notice of completion to the consumer device.

In some embodiments, the identification of the of the one or more merchants further comprises preceding the determination of the subset of the plurality of merchants able to provide the service, at the location, within the time frame, calculate a relevance score for each of the one or more merchants, and identify at least the first merchant, the first merchant having a highest relevance score.

In some embodiments, a computer program product may be provided for programmatically providing a platform for requesting on-demand services on a consumer device, the computer program product comprising at least one non-transitory computer-readable storage medium having computer-executable program code instructions stored therein, the computer-executable program code instructions comprising program code instructions for receiving a job request, the job request indicative of a job to be performed for a consumer, the job request comprising of job request parameters, the job request parameters comprising at least a type of service, a location, and a time frame, identifying one or more merchants able to provide the service in accordance with the job request parameters, the identification of the one or more merchants including accessing a merchant database, the merchant database including information related to each of a plurality of merchants, and determining a subset of the plurality of merchants able to provide the service, at the location, within the time frame, causing transmission of a job offer to at least a first merchant of the subset of one or more merchants identified as able to provide the service in accordance with the job request parameters, receiving at least one response, the at least one response from the first merchant from the one or more merchants, and assigning the job to the first merchant.

In some embodiments, the computer-executable program code instructions further comprise program code instructions for causing transmission of a job offer to the subset of one or more merchants identified as able to provide the service in accordance with the job request parameters, and subsequent to the transmission of the job offer, awaiting a predefined amount of time for each of a plurality of responses, and identifying a ranking associated with the merchant providing each of the plurality of responses, wherein the first merchant is the merchant having the highest ranking.

In some embodiments, the computer-executable program code instructions further comprise program code instructions for causing transmission of a job offer to the subset of one or more merchants identified as able to provide the service in accordance with the job request parameters, and subsequent to the transmission of the job offer, assigning the job to the first merchant to respond.

In some embodiments, the computer-executable program code instructions further comprise program code instructions for providing notification to the first merchant, the notification indicative of the assignment of the job, and receiving field worker information from the first merchant, the field worker information indicative of one or more field workers tasked with completing the job.

In some embodiments, the computer-executable program code instructions further comprise program code instructions for causing identification, to the consumer device, of the merchant and the one or more field workers.

In some embodiments, the computer-executable program code instructions further comprise program code instructions for enabling communication directly to a field worker device, the field worker device operated by at least one of the one or more field workers tasked with completing the job, wherein the enabled communication allowing the field worker device to transmit job-related information and job-related updates.

In some embodiments, the computer-executable program code instructions further comprise program code instructions for receiving a notice of completion from the field worker device, providing the notice of completion to the consumer device, requesting a payment, receiving payment and feedback information, the feedback information related to a performance of the first merchant and the one or more field workers, and providing variable compensation to the first merchant and the one more field workers, the variable compensation being a portion of the payment, the portion being dependent on the feedback.

In some embodiments, the computer-executable program code instructions further comprise program code instructions for subsequent to receiving the job request, calculating an estimate price based on the job request parameters, causing transmission of the estimate prices to the consumer device, and awaiting confirmation before proceeding to the identification of the one or more merchants.

In some embodiments, the computer-executable program code instructions further comprise program code instructions for subsequent to receiving the job request and identification of the one or more merchants able to provide the service in accordance with the job request parameters, calculating an estimate price based on the job request parameters and the first merchant of the subset of one or more merchants identified as able to provide the service in accordance with the job request parameters, and causing transmission of the estimate prices to the consumer device, and awaiting confirmation before proceeding to the transmission of the job offer.

In some embodiments, the computer-executable program code instructions further comprise program code instructions for receiving a notice of completion from the field worker device, in an instance in which completion is confirmed via visual inspection, receiving image data indicative of completion, causing examination of the image data to confirm completion, and providing the notice of completion to the consumer device.

In some embodiments, the computer-executable program code instructions further comprise program code instructions for preceding the determination of the subset of the plurality of merchants able to provide the service, at the location, within the time frame, calculating a relevance score for each of the one or more merchants, and identifying at least the first merchant, the first merchant having a highest relevance score.

In some embodiments, a method may be provided for programmatically providing a platform for requesting on-demand services on a consumer device, the method comprising determining a current location of the consumer device, presenting, on a display of the consumer device, a user interface providing one or more available services in a region embodying the current location and enabling selection of at least one of the available services, receiving a requested service, the requested service being the at least one of the available services, accessing a service parameter database to identify one or more service fulfilment elements associated with the requested service, presenting, on the display, a modified user interface providing the one or more fulfilment elements associated with the selected service and enabling selection of at least one of the one or more fulfilment elements or input of data related to the one or more fulfilment elements, receiving one or more job request parameters, the one or more job request parameters being the selected fulfilment elements or data input related to the one or more fulfilment elements, identifying a first merchant able to provide the service in accordance with the job request parameters, and assigning the job to the first merchant.

In some embodiments, the method may further comprise identifying one or more merchants able to provide the service in accordance with the job request parameters, the one or more merchants including the first merchant.

In some embodiments, the method may further comprise accessing a merchant database, the merchant database comprising a plurality of merchants and information related to each of a plurality of merchants, the information being any of (1) one or more regions that the merchant is able to operate in, (2) one or more services that the merchant is able to perform, (3) hours of operation per region and per service, (4) reviews, (5) ratings, (6) each of one or more field workers, (7) for each field worker, one or more of the services they are able to perform, the regions they operate in, the hours they operate, a skill percentage per service, whether or not any complaints exist, background check information.

In some embodiments, the method may further comprise determining a subset of the plurality of merchants able to provide the service, at the current location.

In some embodiments, the method may further comprise causing transmission of a job offer to at least a first merchant of the subset of one or more merchants identified as able to provide the service in accordance with the job request parameters, and receiving at least one response, the at least one response from the first merchant from the one or more merchants.

In some embodiments, the first merchant is one of (1) a highest rated merchant amount the subset of plurality of merchants, (2) a most timely as calculated by a determination of a field worker location determination at a time of the job request, or (3) a highest skilled calculated by an identification of available field workers.

In some embodiments, determining the current location of the computing device includes retrieving location information using geo-aware resources of the computing device.

In some embodiments, determining the current location of the computing device includes presenting a location selection user interface on the display, the location selection user interface presenting one or more locations that are determined based on previous locations at which the user requested performance of the on-demand service, and receiving a user selection of one of the one or more locations presented on the location selection user interface.

In some embodiments, a computer program product may be provided for programmatically providing a platform for requesting on-demand services on a consumer device comprising at least one non-transitory computer-readable storage medium having computer-executable program code instructions stored therein, the computer-executable program code instructions comprising program code instructions for determining a current location of the consumer device, presenting, on a display of the consumer device, a user interface providing one or more available services in a region embodying the current location and enabling selection of at least one of the available services, receiving a requested service, the requested service being the at least one of the available services, accessing a service parameter database to identify one or more service fulfilment elements associated with the requested service, presenting, on the display, a modified user interface providing the one or more fulfilment elements associated with the selected service and enabling selection of at least one of the one or more fulfilment elements or input of data related to the one or more fulfilment elements, receiving one or more job request parameters, the one or more job request parameters being the selected fulfilment elements or data input related to the one or more fulfilment elements, identifying a first merchant able to provide the service in accordance with the job request parameters, and assigning the job to the first merchant.

In some embodiments, the computer-executable program code instructions further comprise program code instructions for identifying one or more merchants able to provide the service in accordance with the job request parameters, the one or more merchants including the first merchant.

In some embodiments, the computer-executable program code instructions further comprise program code instructions for accessing a merchant database, the merchant database comprising a plurality of merchants and information related to each of a plurality of merchants, the information being any of (1) one or more regions that the merchant is able to operate in, (2) one or more services that the merchant is able to perform, (3) hours of operation per region and per service, (4) reviews, (5) ratings, (6) each of one or more field workers, (7) for each field worker, one or more of the services they are able to perform, the regions they operate in, the hours they operate, a skill percentage per service, whether or not any complaints exist, background check information.

In some embodiments, the computer-executable program code instructions further comprise program code instructions for determining a subset of the plurality of merchants able to provide the service, at the current location.

In some embodiments, the computer-executable program code instructions further comprise program code instructions for causing transmission of a job offer to at least a first merchant of the subset of one or more merchants identified as able to provide the service in accordance with the job request parameters, and receiving at least one response, the at least one response from the first merchant from the one or more merchants.

In some embodiments, the first merchant is one of (1) a highest rated merchant amount the subset of plurality of merchants, (2) a most timely as calculated by a determination of a field worker location determination at a time of the job request, or (3) a highest skilled calculated by an identification of available field workers.

In some embodiments, determining the current location of the computing device includes retrieving location information using geo-aware resources of the computing device.

In some embodiments, determining the current location of the computing device includes presenting a location selection user interface on the display, the location selection user interface presenting one or more locations that are determined based on previous locations at which the user requested performance of the on-demand service, and receiving a user selection of one of the one or more locations presented on the location selection user interface.

In some embodiments, an apparatus may be provided, the apparatus comprising at least one processor and at least one memory including computer program code, the at least one memory and the computer program code configured to, with the processor, cause the apparatus to at least determine a current location of the consumer device, present, on a display of the consumer device, a user interface providing one or more available services in a region embodying the current location and enabling selection of at least one of the available services, receive a requested service, the requested service being the at least one of the available services, access a service parameter database to identify one or more service fulfilment elements associated with the requested service, present, on the display, a modified user interface providing the one or more fulfilment elements associated with the selected service and enabling selection of at least one of the one or more fulfilment elements or input of data related to the one or more fulfilment elements, receive one or more job request parameters, the one or more job request parameters being the selected fulfilment elements or data input related to the one or more fulfilment elements, identify a first merchant able to provide the service in accordance with the job request parameters, and assign the job to the first merchant.

In some embodiments, the at least one memory and the computer program code are further configured to, with the processor, cause the apparatus to identify one or more merchants able to provide the service in accordance with the job request parameters, the one or more merchants including the first merchant.

In some embodiments, the at least one memory and the computer program code are further configured to, with the processor, cause the apparatus to access a merchant database, the merchant database comprising a plurality of merchants and information related to each of a plurality of merchants, the information being any of (1) one or more regions that the merchant is able to operate in, (2) one or more services that the merchant is able to perform, (3) hours of operation per region and per service, (4) reviews, (5) ratings, (6) each of one or more field workers, (7) for each field worker, one or more of the services they are able to perform, the regions they operate in, the hours they operate, a skill percentage per service, whether or not any complaints exist, background check information.

In some embodiments, the at least one memory and the computer program code are further configured to, with the processor, cause the apparatus to determine a subset of the plurality of merchants able to provide the service, at the current location.

In some embodiments, the at least one memory and the computer program code are further configured to, with the processor, cause the apparatus to cause transmission of a job offer to at least a first merchant of the subset of one or more merchants identified as able to provide the service in accordance with the job request parameters, and receive at least one response, the at least one response from the first merchant from the one or more merchants.

In some embodiments, the first merchant is one of (1) a highest rated merchant amount the subset of plurality of merchants, (2) a most timely as calculated by a determination of a field worker location determination at a time of the job request, or (3) a highest skilled calculated by an identification of available field workers.

In some embodiments, determining the current location of the computing device includes retrieving location information using geo-aware resources of the computing device.

In some embodiments, determining the current location of the computing device includes presenting a location selection user interface on the display, the location selection user interface presenting one or more locations that are determined based on previous locations at which the user requested performance of the on-demand service, and receiving a user selection of one of the one or more locations presented on the location selection user interface.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
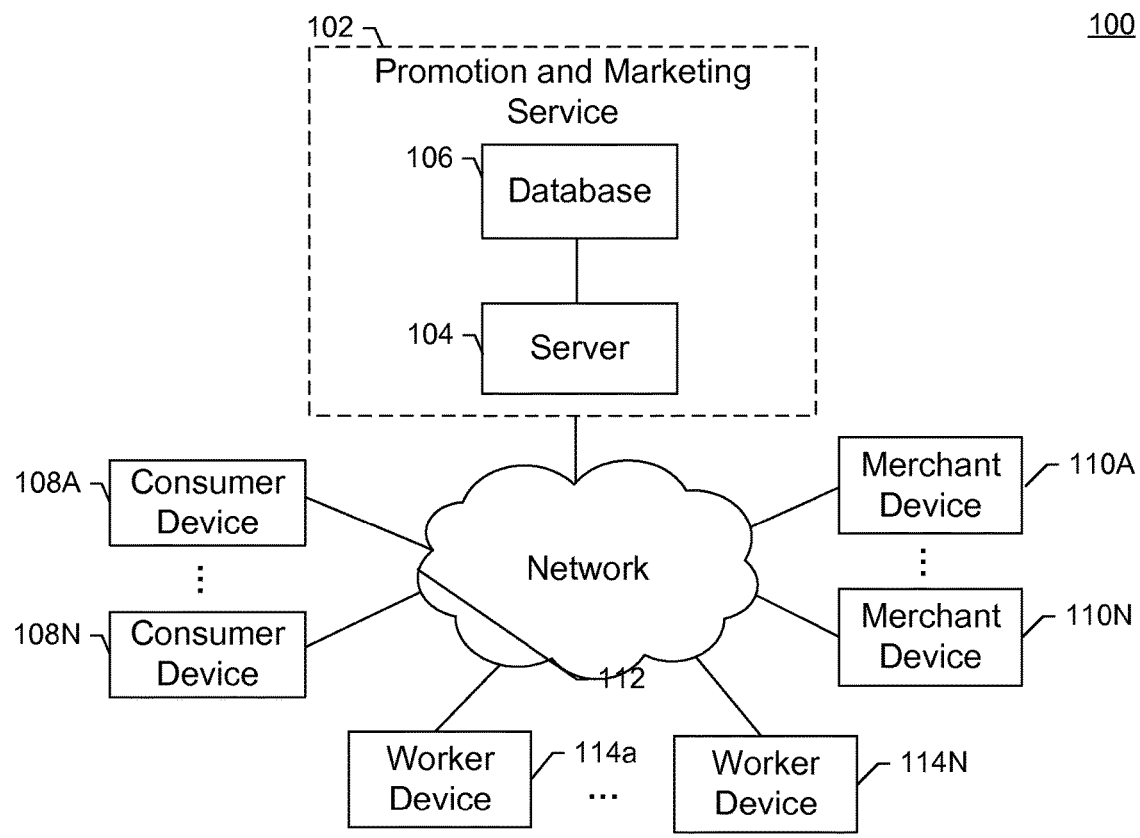
Figure 2:
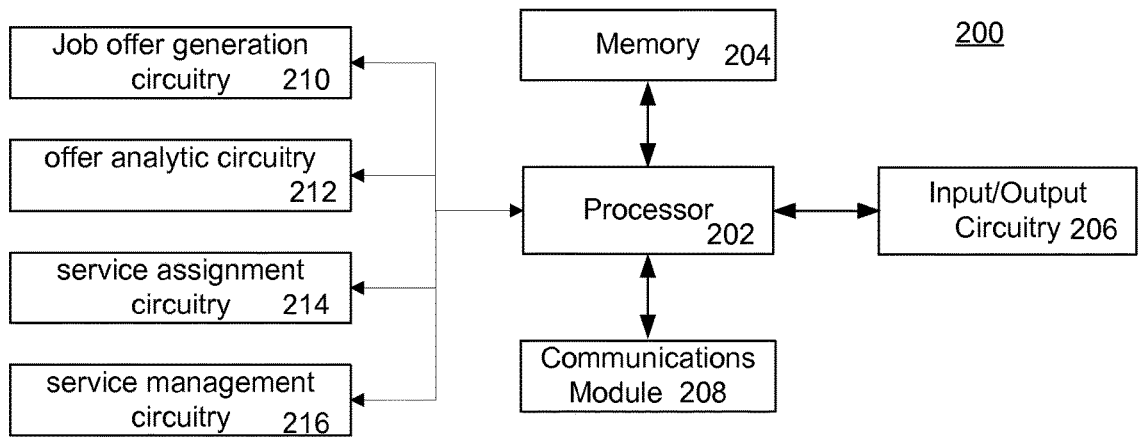
Figure 3:
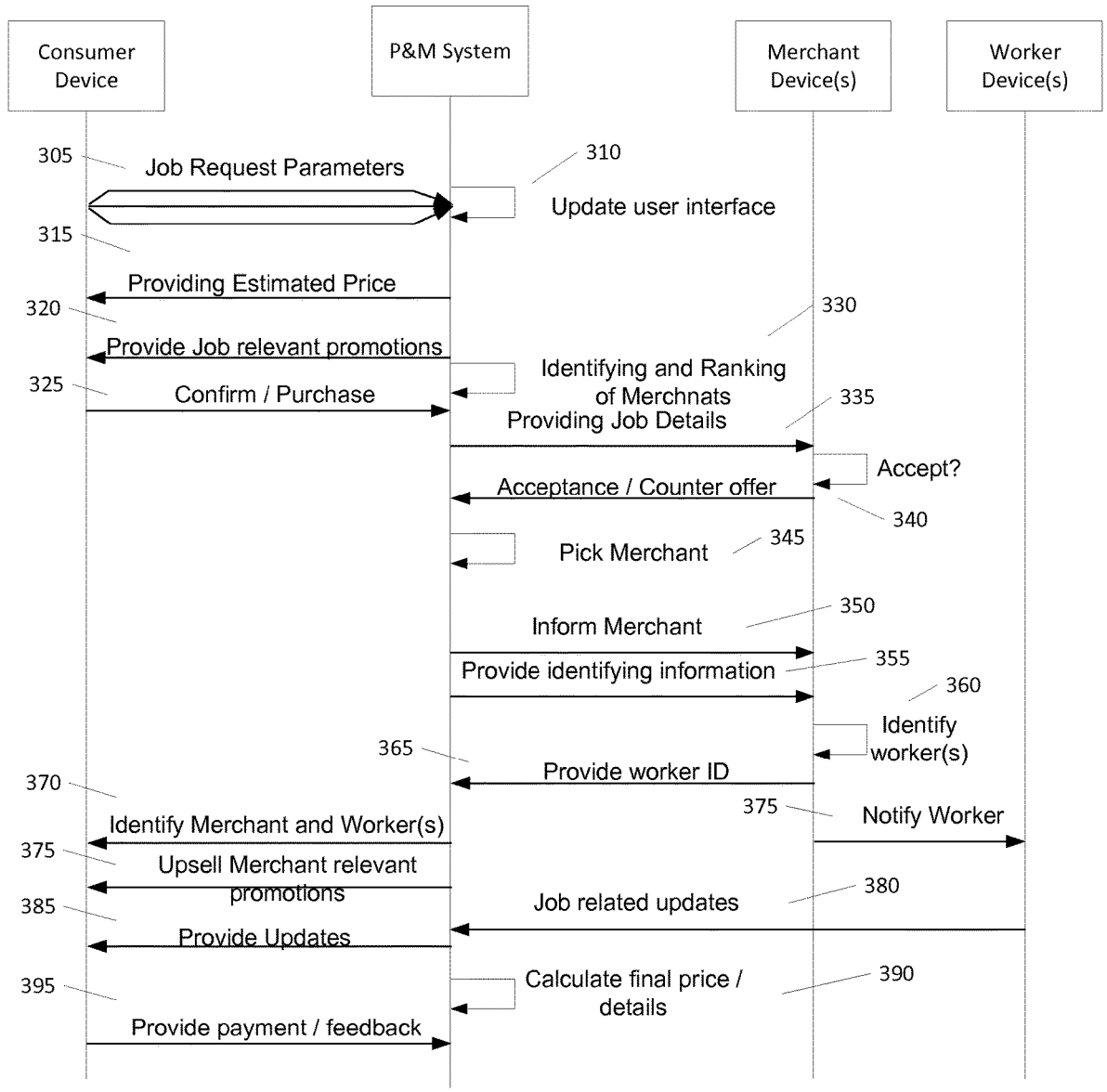
Figure 4:
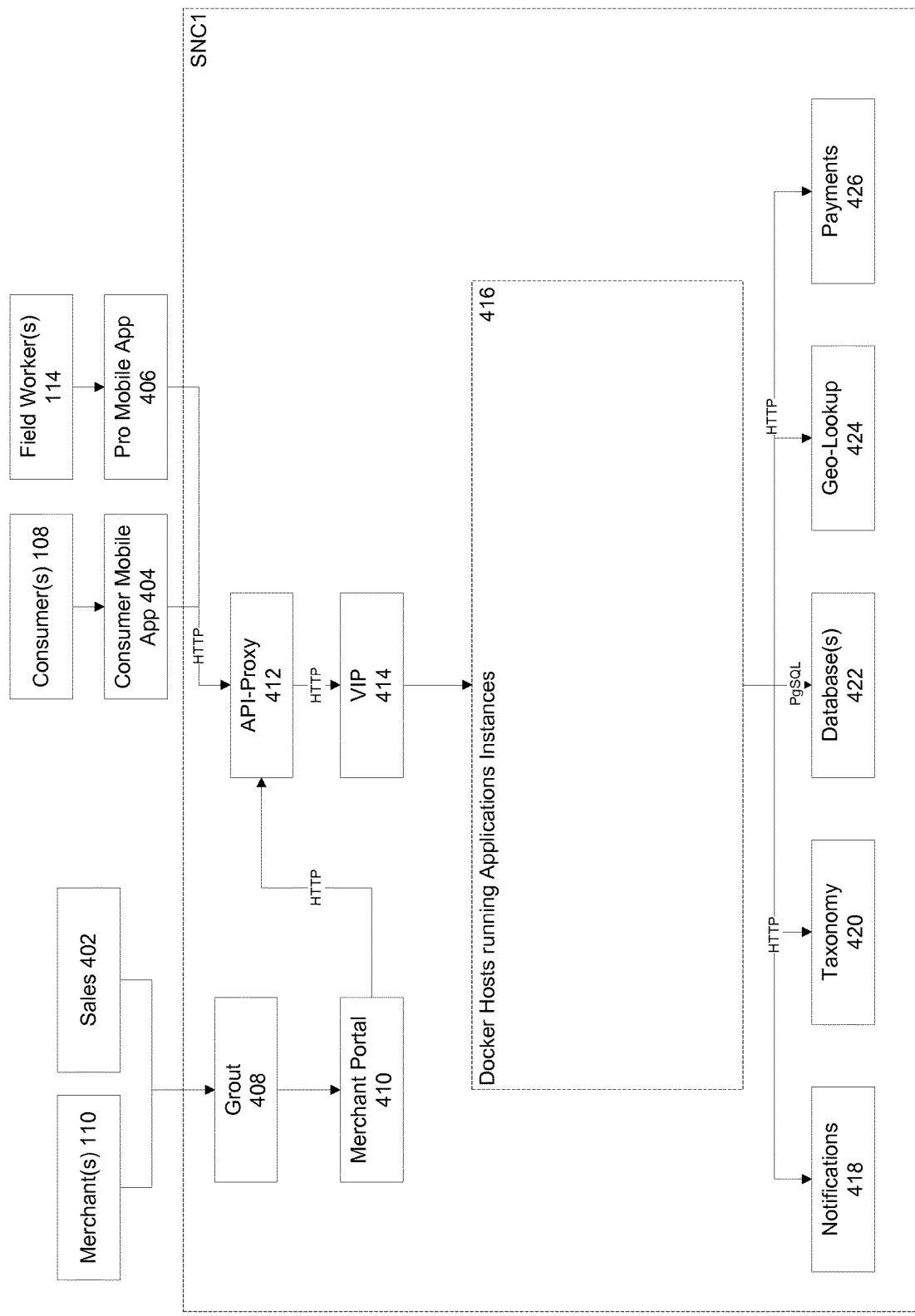
Figure 5:
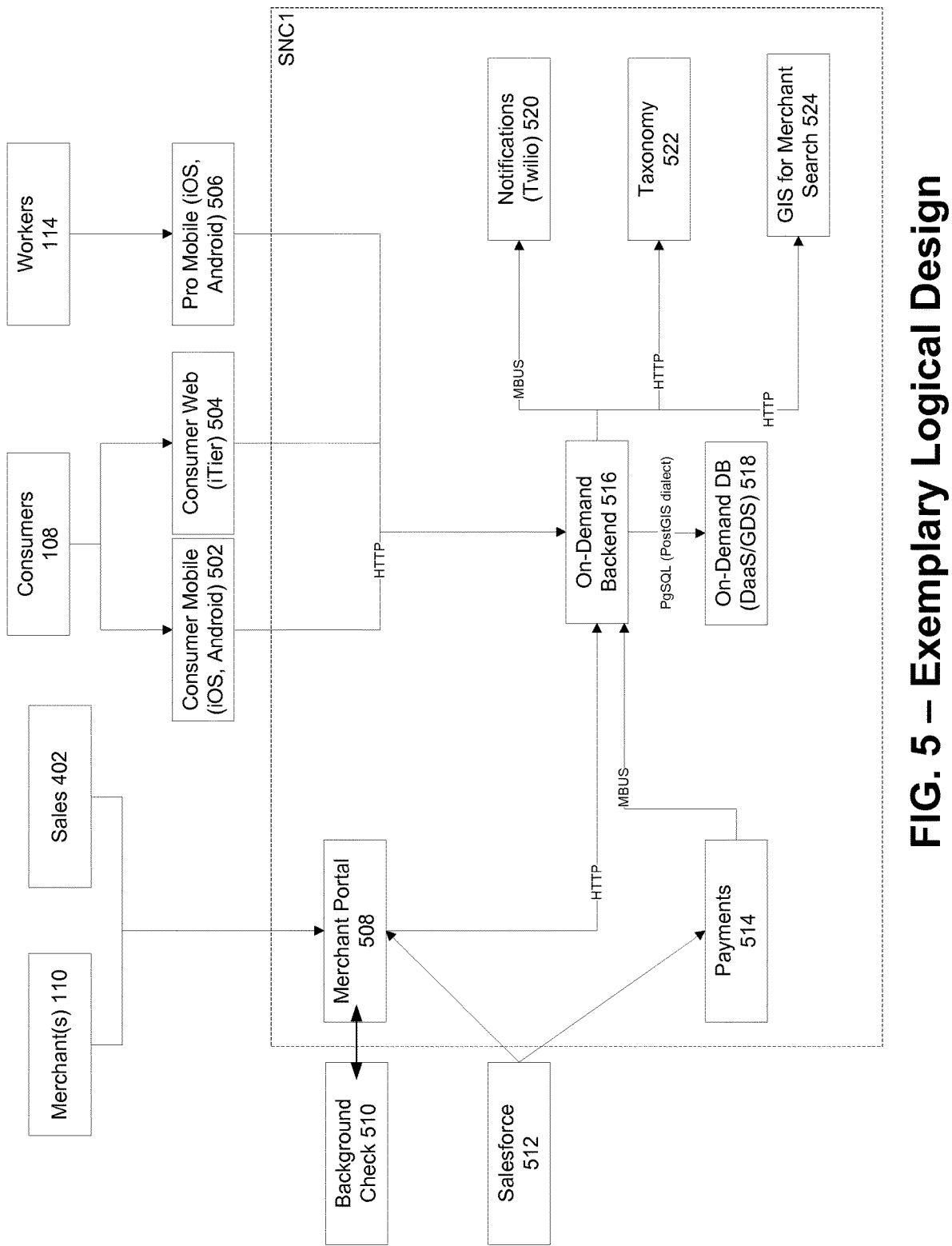
Figure 6:
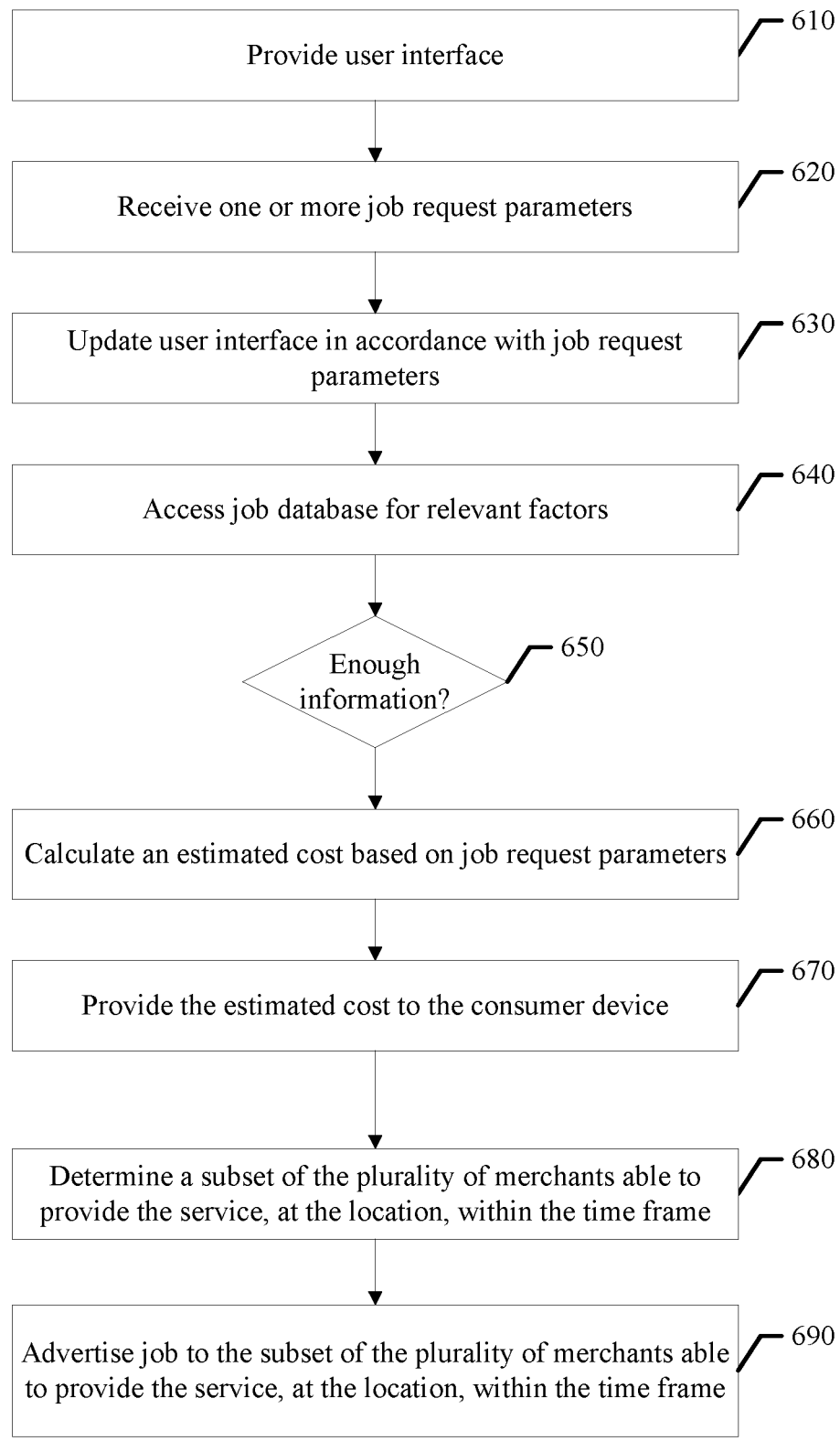
Figure 7:
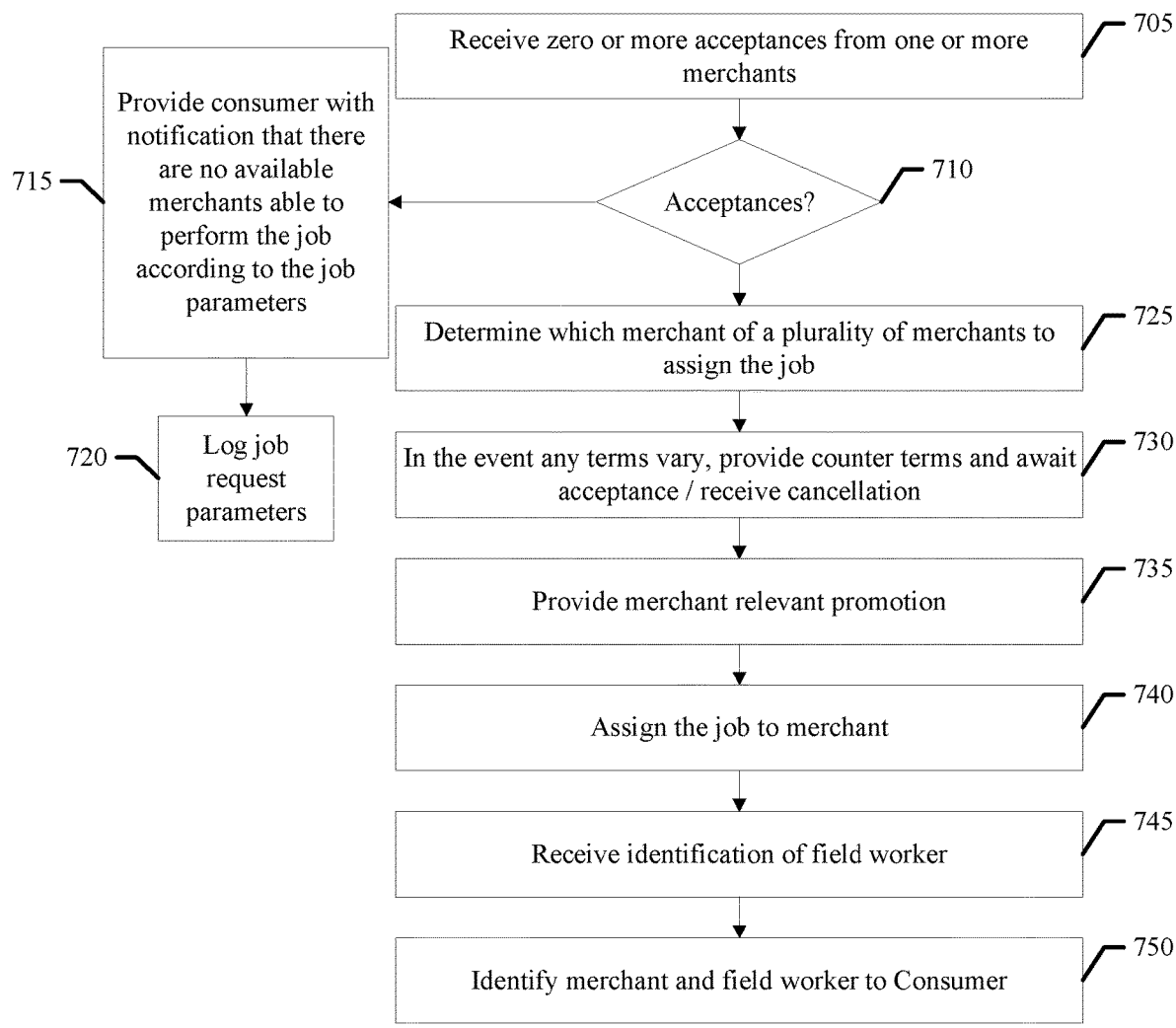
Figure 8:
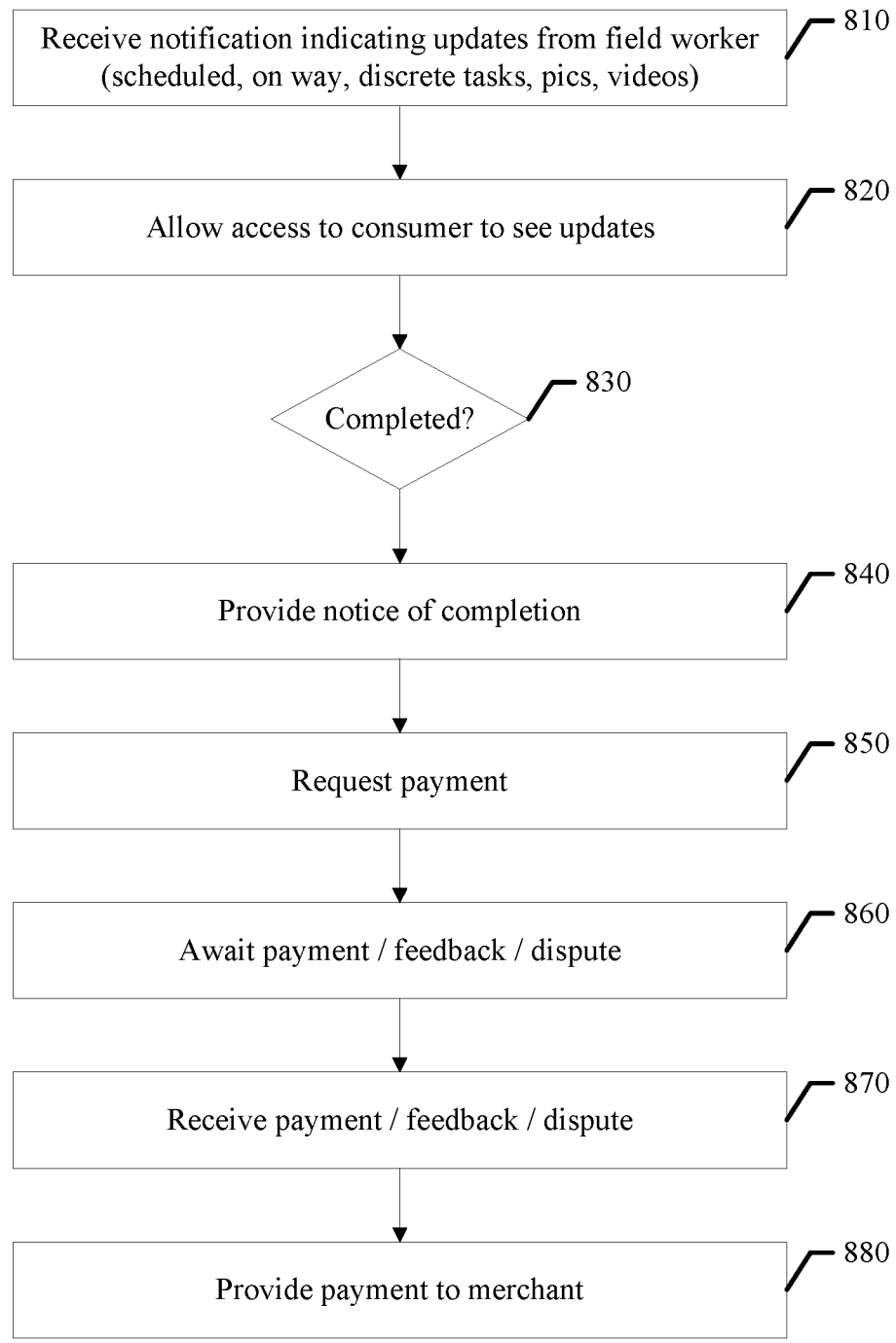

Having thus described certain example embodiments of the present disclosure in general terms, reference will now be made to the accompanying drawings, which are not necessarily drawn to scale, and wherein:

FIG. 1 illustrates an example system within which embodiments of the present invention may operate;

FIG. 2 illustrates a block diagram showing an example device for implementing a merchant intelligence platform using special-purpose circuitry in accordance with some example embodiments of the present invention;

FIG. 3 shows a data flow diagram in accordance with some example embodiments of the present invention;

FIG. 4 illustrates a block diagram showing an example device using special-purpose circuitry in accordance with some example embodiments of the present invention;

FIG. 5 illustrates a block diagram showing an example device using special-purpose circuitry in accordance with some example embodiments of the present invention;

FIG. 6 illustrates a flowchart describing example in accordance with some example embodiments of the present invention;

FIG. 7 illustrates a flowchart describing example in accordance with some example embodiments of the present invention; and FIG. 8 illustrates a flowchart describing example in accordance with some example embodiments of the present invention.

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

Overview

Various embodiments of the present invention are directed to improved apparatuses, methods, and computer readable media for facilitating on-demand home and auto services. More particularly, some embodiments of the present invention enable the identification of one or more particular merchants able to provide request services and the facilitation of the transaction.

In one exemplary embodiment, a promotion and marketing system provides a mobile app or website allowing a consumer operating a consumer device to request a job be done, such as for example, having their home cleaned or car repaired. The job request can include job request parameters such as the particular job, the location of their home (123 Happy Street), and a time frame in which the job should be done (e.g., between 3-5 pm). The job request may include other job specific parameters such as for example, in the event the job is home cleaning, the size of the home, whether pets live there, etc.

A promotion and marketing system may then identify a merchant that is able to perform the requested job. The identification of the merchant may be performed by accessing a specially configured database, the database specially configured storing information related to a plurality of merchants. The database may be populated by crawling the web and/or through a registration process, and the data may include, for each merchant, the services they perform, their hours, the locations they service, etc.

Once one or more merchants are identified as able to complete the job, the promotion and marketing system may provide a job offer to each of one or more merchants identified as able to complete the job or a subset of those merchants.

The promotion and marketing system may then award the job to, for example, the first or, in other embodiments, the most highly ranked merchant who accepted the job offer. Once a merchant is assigned, the promotion and marketing system may notify the merchant and receive information related to the one or more field workers who are tasked to complete the job. The promotion and marketing system may then notify the consumer of the merchant and particular field workers who will be completing the job.

The promotion and marketing system may then enable communication allowing the field workers to update the status of the job. Once the job is completed, the promotion and marketing system may request payment and feedback. Once payment and feedback are received, the promotion and marketing system may then provide a portion of the payment to the merchant and/or the field workers. In some embodiments, the portion of the payment provided to the merchant and/or filed workers is dependent on the feedback.

Definitions

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

The term "service" as used herein refers to the action of doing work or performing a task for another. For example, cleaning is a service that is often offered and/or performed by one person to another. A "requested service" as used herein refers to a particular piece of work or particular task that is requested by one person to another. For example, a homeowner may inquire about and later hire a cleaning company to clean their home, the home cleaning being the requested service.

The term "job" as used herein represents a service to be performed in accordance with job request parameters, such as for example, at a particular location and within a particular time frame. A job offer, as used herein, is an offer made by a promotion and marketing system to a merchant identified as generally able to perform the services required by the job in accordance with the job request parameters. A job offer may be limited in duration and may expire at that time at which a different merchant accepts the job offer and/or is assigned to the job.

The term "field worker" as used herein may refer to an employee or any other person otherwise tasked by a merchant to complete a job and/or perform any tasks associated with or required by the job. In some examples a field worker and a merchant could refer to the same entity.

The term "notification" as used herein represents a type of communication and can be sent from and/or to a consumer device, a promotion and marketing system, a merchant device, or a field worker device. A notification may include a recipient, a subject, a message, audio data, picture data, or video data. Notifications may be delivered in accordance with user preferences including, for example, in-app, via SMS, via robo-call, via email, or the like.

Technical Underpinnings and Implementation of Exemplary Embodiments

When offering services, for example, via a promotion and marketing service, consumers interact with the promotion and marketing service to provide details of the request, such as the particular service, location, time frame, required rating, experience level and the like. Given the dynamic aspect of the services offered, each having a different subset of tasks and each consumer being located a different locations, Applicant has identified technical problems related to pricing the requested services. Current on-demand offerings provide services that are easily priced. For example, moving a person from one location to another is dependent on distance and in some cases, the type of vehicle and the amount of passengers. However, having a home cleaned has many variables that an accurate estimate is impossible with the current state of technology. Moreover, current on-demand offerings provide rudimentary matching offerings. For example, in offer homes to stay in, a provider allows the user to search by location, price, number of guests, and certain amenities. The shear amount of results often precludes any sort of on-demand matching. Moving a person-type services simply identify drivers within an area and send them the request. Identifying the completion of a task is particularly difficult. Existing technology simply doesn't need to account for identifying completion. Moving a person-type services deem the service complete upon arriving at the destination and charge the person's credit card. Given the subjective nature of more complex service offerings, Applicant had identified various problems and difficulties that occur in identifying the completion of a service and charging a consumer.

The inventors have realized that, without better methods of pricing, matching, and determining completion as well as more responsive or convenient processes, consumers may forego on-demand job requests resulting in lost revenue of both the merchant and the promotion and marketing service. The inventors have therefore determined that existing electronic systems for requesting services fail to address these issues. As a result of these problems and others that may arise from time to time, delays and inefficiencies may be introduced into the process of requesting services.

System Architecture

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Merchants may access a promotion and marketing service 102 via a network 112 (e.g., the Internet, or the like) using computer devices 108A through 108N and 110A through 110N, respectively (e.g., one or more consumer devices 108A-108N or one or more merchant devices 110A-110N). The promotion and marketing service 102 may function to provide a merchant intelligence platform as described herein and below. Moreover, the promotion and marketing service 102 may comprise a server 104 in communication with a database 106.

The server 104 may be embodied as a computer or computers as known in the art. The server 104 may provide for receiving of electronic data from various sources, including but not necessarily limited to the consumer devices 108A-108N and the merchant devices 110A-110N. For example, the server 104 may be operable to receive and process clickstream data provided by the consumer devices 108 and/or the merchant devices 110. The server 104 may also facilitate e-commerce transactions based on transaction information provided by the consumer devices 108 and/or the merchant devices 110. The server 104 may facilitate the generation and providing of various electronic communications and marketing materials based on the received electronic data.

The database 106 may be embodied as a data storage device such as a Network Attached Storage (NAS) device or devices, or as a separate database server or servers. The database 106 includes information accessed and stored by the server 104 to facilitate the operations of the promotion and marketing service 102. For example, the database 106 may include, without limitation, user account credentials for system administrators, merchants, and consumers, data indicating the products and promotions offered by the promotion and marketing service, electronic marketing information, analytics, reports, financial data, and/or the like.

The consumer devices 108A-108N may be any computing device as known in the art and operated by a consumer. Electronic data received by the server 104 from the consumer devices 108A-108N may be provided in various forms and via various methods. For example, the consumer devices 108A-108N may include desktop computers, laptop computers, smartphones, netbooks, tablet computers, wearables, and the like. The information may be provided through various sources on these consumer devices.

In embodiments where a consumer device 108 is a mobile device, such as a smart phone or tablet, the consumer device 108 may execute an "app" to interact with the promotion and marketing service 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing service 102 may leverage the application framework offered by the mobile operating system to allow consumers to designate which information is provided to the app and which may then be provided to the promotion and marketing service 102. In some embodiments, consumers may "opt in" to provide particular data to the promotion and marketing service 102 in exchange for a benefit, such as improved relevancy of marketing communications offered to the user. In some embodiments, the consumer may be provided with privacy information and other terms and conditions related to the information provided to the promotion and marketing service 102 during installation or use of the app. Once the consumer provides access to a particular feature of the mobile device, information derived from that feature may be provided to the promotion and marketing service 102 to improve the quality of the consumer's interactions with the promotion and marketing service.

For example, the consumer may indicate that they wish to provide location information to the app from location services circuitry included in their mobile device. Providing this information to the promotion and marketing service 102 may enable the promotion and marketing service 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing service 102. For example, the consumer may decide at a later point to disable the ability of the app to access the location services circuitry, thus limiting the access of the consumer's location information to the promotion and marketing service 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 108 may interact through the promotion and marketing service 102 via a web browser. As yet another example, the consumer device 108 may include various hardware or firmware designed to interface with the promotion and marketing service 102 (e.g., where the consumer device 108 is a purpose-built device offered for the primary purpose of communicating with the promotion and marketing service 102, such as a store kiosk).

The merchant devices 110A-110N may be any computing device as known in the art and operated by a merchant. For example, the merchant devices 110A-110N may include a merchant point-of-sale, a merchant local marketing device, a merchant e-commerce server, a merchant inventory system, or a computing device accessing a web site designed to provide merchant access (e.g., by accessing a web page via a browser using a set of merchant account credentials). The merchant devices 110A-110N may also be mobile devices as described above with respect to the consumer devices 108A-108N.

Electronic data received by the promotion and marketing service 102 from the merchant devices 110A-110N may also be provided in various forms and via various methods. For example, the merchant devices 110A-110N may provide real-time notifications and/or status information as the requested services are assigned, scheduled, completed or the like. In other embodiments, the merchant devices 110A-110N may be employed to provide information to the promotion and marketing service 102 to enable the promotion and marketing service 102 to generate promotions or other marketing information to be provided to consumers.

The worker devices 114A-114N may be any computing device as known in the art and operated by a person "out in the field", for example, away from a desk, and in many instances a differing locations on an hourly, daily, weekly or monthly basis. Electronic data received by the server 104 from the worker devices 114A-114N may be provided in various forms and via various methods. For example, the worker devices 114A-114N may include desktop computers, laptop computers, smartphones, netbooks, tablet computers, wearables, and the like. The information may be provided through various sources on these worker devices 114A-114N.

In embodiments where a worker device 114 is a mobile device, such as a smart phone or tablet, the worker device 114 may execute an "app" to interact with the promotion and marketing service 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

An example of a data flow for exchanging electronic information among the promotion and marketing service, one or more consumer devices, one or more merchant devices, and one or more worker devices is described below with respect to FIG. 3.

Example Apparatuses for Implementing Embodiments of the Present Invention

The server 104 may be embodied by one or more computing systems, such as apparatus 200 shown in FIG. 2. As illustrated in FIG. 2, the apparatus 200 may include a processor 202, a memory 204, input/output circuitry 206, communications circuitry 208, job offer generation circuitry 210, offer analytic circuitry 212, service assignment circuitry 214, and service management circuitry 216. The apparatus 200 may be configured to execute the operations described with respect to FIGS. 3 and 6-8. Although these components 202-216 are described with respect to functional limitations, it should be understood that the particular implementations necessarily include the use of particular hardware. It should also be understood that certain of these components 202-214 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The job offer generation circuitry 210 includes hardware configured to receive job request parameters, update an interface depending on particular job request parameters, and generate job offers offered by a promotion and marketing service to a merchant. The job offer generation circuitry 210 may be configured to receive a job request and one or more job offer parameters from a consumer and subsequently, to generate an estimated cost. The job offer generation circuitry 210 may further be configured to identify which merchants to advertise the job offer.

The job offer generation circuitry 210 may utilize processing circuitry, such as the processor 202, to perform these actions. The job offer generation circuitry 210 may receive the job request and/or otherwise communicate with a consumer device via a network interface provided by the communications circuitry 208. However, it should also be appreciated that, in some embodiments, the job offer generation circuitry 210 may include a separate processor, specially configured field programmable gate array (FPGA), or application specific interface circuit (ASIC) to manage the reception of job requests and/or job request parameters. The job offer generation circuitry 210 is therefore implemented using hardware components of the apparatus configured by either hardware or software for implementing these planned functions.

The offer analytic circuitry 212 includes hardware configured to manage, store, process, and analyze job requests and job request parameters to determine market prices to accurately provide estimate costs for particular jobs. The offer analytic circuitry 212 may be further configured to identify those job offers and/or those job offer parameters that are unable to be fulfilled. The offer analytic circuitry 212 may be configured to generate a variety of data for use in support of a promotion and marketing system. Although the processor 202 may be employed to perform analysis of the job request, job request parameters, and/or job offers to generate business analytic data, it should also be appreciated that, in some embodiments, the offer analytic circuitry 212 may include a separate processor, specially configured field programmable gate array (FPGA), or application specific interface circuit (ASIC) to manage generation of the business analytics data. The information analyzed by the offer analytic circuitry 212 and the information generated by the offer analytic circuitry 212 may be stored and/or accessed from a memory, such as the memory 204. The offer analytic circuitry 212 is therefore implemented using hardware components of the apparatus configured by either hardware or software for implementing these planned functions.

The service assignment circuitry 214 includes hardware configured to receive notifications accepting a job offer, and assigning merchants to particular job. Although the processor 202 may be employed to assign merchants to particular jobs, it should also be appreciated that, in some embodiments, the service assignment circuitry 214 may include a separate processor, specially configured field programmable gate array (FPGA), or application specific interface circuit (ASIC).

The service management circuitry 216 includes hardware configured to receive notifications indicating updates and track the status of each job. Although the processor 202 may be employed to assign merchants to particular jobs, it should also be appreciated that, in some embodiments, the service management circuitry 216 may include a separate processor, specially configured field programmable gate array (FPGA), or application specific interface circuit (ASIC).

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by example displays described herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Data Flow

FIG. 3 depicts an example data flow 300 illustrating interactions between a consumer device, the promotion and marketing system, one or more merchant devices, and one or more worker devices. The data flow 300 illustrates how electronic information may be passed among various systems in accordance with embodiments of the present invention.

At step 305, the promotion and marketing system, via a user interface provided on a consumer device, receives job request parameters including, for example, a category or service type of job (e.g., home cleaning, car detailing, home sitting, tutoring, music lessons, etc.). Other parameters may include location and a requested time. At step 310, the promotion and marketing service may update the user interface as the consumer device provides the job request parameters. For example, in the event a consumer device indicates house cleaning as a service type, the user interface may be updated such that other parameters may be service type related. For example, other parameters that may be provide include size of house, number and type of rooms, whether pets are present and/or any other special instructions and/or considerations.

At step 315, the promotion and marketing system may calculate and provide an estimated price. During the calculation, or in some embodiments, while providing the estimated price, the promotion and marketing system, at step 320, may determine and/or provide job-relevant promotions. In each of U.S. patent application Ser. No. 13/411,502, filed Mar. 2, 2012, titled "RELEVANCE SYSTEM FOR CONSUMER DEALS", U.S. patent application Ser. No. 13/829,581 entitled "Promotion Offering System" and filed on Mar. 14, 2013, U.S. patent application Ser. No. 12/776,028, now U.S. Pat. No. 8,355,948, titled "SYSTEM AND METHODS FOR DISCOUNT RETAILING" filed on May 7, 2010, each of which is hereby incorporated by reference in its entirety, algorithms are provided for providing relevant promotions to consumers.

At step 325, the promotion and marketing system may receive confirmation from the consumer device indicative of the user's desire to continue.

At step 330, the promotion and marketing system identifies merchants capable of providing the job as described by the job request parameters. Additionally or alternatively, the promotion and marketing system may be configured to rank, and in some embodiments, identify those merchants meeting a defined threshold. At step 335, the promotion and marketing system may provide a subset of the job request parameters to a portion of those merchants identified as able to provide the request services.

At step 340, the promotion and marketing system is configured to receive one or more indications from the merchants indicating their acceptance, or in some embodiments, a counter offer. In the event of a counter offer, the promotion and marketing system may only notify the consumer if no acceptances are received.

At step 345, the promotion and marketing system picks a merchant, for example, based on the previous ranking. For example, the promotion and marketing system may be configured to award the job to the highest ranked merchant indicating their acceptance. At step 350, the promotion and marketing system notifies the merchant. At step 355, the promotion and marketing system may provide identifying information. For example, the initial details may have only given a general location, neighborhood or the like. Here, an address may be provided.

At step 360, the merchant device may identify a particular worker or workers who will provide the services and/or complete the job and provide that information to the promotion and marketing system. At 365, the promotion and marketing system may identify one or both the merchant and worker.

At 370, the promotion and marketing system may be configured to provide merchant relevant promotions. At step 375, the merchant may notify the worker and provide any necessary information to the worker necessary for the worker to complete the job. At step 380, the promotion and marketing system may be configured to allow worker devices and/or merchant devices to provide updates, and as such, receive updates from one or both the worker device(s) or merchant device.

At step 385, the promotion and marketing system may be configured to provide updates to the consumer device and/or allow the consumer device to access the promotion and marketing system to see any updates provided by the worker device(s) and/or merchant device. At step 390, once an update indicates the job is complete, the promotion and marketing system may calculate (e.g., if changes are necessary based on for example, information received from the merchant and device and/or worker device(s)) and/or provide the final price. At step 395, the promotion and marketing system may receive payment and/or feedback on the merchant and/or the worker(s). The promotion and marketing system may be configured to store the feedback such that particular factors in merchant scoring are affected at a future job request.

Exemplary Physical Design for Implementing Embodiments of the Present Invention FIG. 4 shows an exemplary physical design for implementing embodiments of the present invention. As shown, merchant device 110 and a sales device 402 may access merchant portal 410 via GROUT 408. Consumer device 108 may access API-Proxy 412 via a consumer mobile app 404. A worker device 114 may access an API-Proxy 412 via pro mobile app 406. API-Proxy 412 may then access 414 which then accesses for example, three docker hosts running five application instances 416, the application instances being notifications 418, taxonomy 420, database(s) 422, geo-lookup 424, and payments 426, the use of each is described in below with reference to FIG. 5.

Exemplary Logical Design for Implementing Embodiments of the Present Invention FIG. 5 shows an exemplary logical design for implementing embodiments of the present invention. As shown, merchant device 110 and a sales device 402 may access a merchant portal. For a merchant to be entered, a background check 510 may be necessary. Consumer device 108 may access a consumer mobile app 502 or a consumer website 504. A worker device 114 may access a pro mobile app 506. The consumer mobile app 502 and web apps may be configured to enable consumers to make bookings for particular services and notify consumers during significant events in the booking lifecycle. In some embodiments, payment information may also be managed.

The pro mobile app 502 may be configured to alert field workers when they have been assigned a job by the merchant and/or a dispatcher. The pro mobile app 502 may also be configured to allow the field workers to modify booking details when they reach the job site.

A salesforce portal 512 may also interact with the merchant portal 508 as well as a payments module 514. The merchant portal 508 may be configured to allow a sales rep to add additional information about each merchant that signs up. This includes geographical information such as service locations and service areas. In some embodiments, an additional dashboard in the merchant portal may allow merchants to dispatch jobs to technicians.

On-demand back end 516 may access on-demand database 518. The on-demand back end 516 exposes a RESTful API to manage merchants, fieldworkers, bookings, notifications and payments. The on-demand database 518 may contain merchant information that is not stored by other services such as for example, availability times of merchants, technician names, and background check status for both merchants and workers, and notification statuses. A notification module 520, a taxonomy 522, and a GIS for merchant search 524 may also be utilized.

Exemplary Operation for Implementing Embodiments of the Present Invention

In some embodiments, apparatus 200 may be configured to identify particular merchants able to provide request services and facilitating the transaction details. FIGS. 6-8 illustrate exemplary processes for receiving, from a consumer device or the like, a job request and/or job request parameters, identifying one or more merchants, assigning a merchant to the job, and facilitating management of the job.

Receiving a Job Request

FIG. 6 illustrates a flow diagram depicting an example of a process 600 for receiving a job request in accordance with embodiments of the present invention. The process illustrates how, upon reception of job request parameters, a promotion and marketing system identifying one or more merchants able to perform the service and transmitting a job offer to the one or more merchants. The process 600 may be performed by an apparatus, such as the apparatus 200 described above with respect to FIG. 2.

As shown in block 610 of FIG. 6, an apparatus, such as apparatus 200, may be configured for providing a user interface, the user interface configured to enable input of job request parameters. As shown in block 620 of FIG. 6, an apparatus, such as apparatus 200, may be configured for receiving job request parameters. For example, job request parameters may include a type of request service (e.g., house cleaning or the like), and other relevant information necessary and/or helpful to perform the request service (e.g., the location of the consumer's home and a time frame within which a field worker can enter the home and perform the cleaning).

As shown in block 630 of FIG. 6, an apparatus, such as apparatus 200, may be configured for updating the user interface in accordance with the received job request parameters. For example, in the event a consumer chooses home cleaning as the type of service, the user interface may be updated to request input of, for example, a number of rooms, a number of bathrooms, whether pets live in the house, whether any occupant of the home is a smoker, etc. In some embodiments, the user interface is a dynamic application environment.

One example of a dynamic application environment is a learning user interface (LUI). Additional description related to a learning user interface that is configured to be adaptive and intuitive. The interface may present one or more dynamic icons to a user, the dynamic icons visually representing one or more corresponding items, the interface configured to visually bias the dynamic icons in order to indicate a suggested icon to a user relative to a secondary icon, are described in U.S. patent application Ser. No. 14/453,913, filed Aug. 7, 2014, titled "Learning User Interface" which is a continuation of U.S. patent application Ser. No. 14/230,970, which is entitled "Learning User Interface" and was filed Mar. 31, 2014, and is also a continuation of U.S. patent application Ser. No. 14/230,980, which is entitled "Learning User Interface" and was filed Mar. 31, 2014, and is also a continuation of U.S. patent application Ser. No. 14/230,996, which is entitled "Learning User Interface" and was filed Mar. 31, 2014, and is also a continuation of U.S. patent application Ser. No. 14/231,015, which is entitled "Learning User Interface" and was filed Mar. 31, 2014, each of which is incorporated by reference herein in its entirety. This application and each of the aforementioned applications claims priority under 35 U.S.C. § 119 to U.S. Provisional Application No. 61/932,046, which is entitled "Living User Interface" and was filed Jan. 27, 2014, which is also incorporated by reference herein in its entirety.

Returning to FIG. 6, as shown in block 640, an apparatus, such as apparatus 200, may be configured for accessing a merchant database, the merchant database including information related to each of a plurality of merchants. For example, a merchant database, which may be populated by a merchant during a registration process or by, for example, a web crawling technology, may include information such as, the services a merchant is able to perform, the location(s) within which the merchant may perform the services, the hours of operation, and the like.

During the input of the job request parameters, the promotion and marketing system may be configured to determine if/when a minimal amount of information has been received to, for example, generate a job offer and/or calculate an estimate price. As shown in block 650 of FIG. 6, an apparatus, such as apparatus 200, may be configured for determining if enough information has been received to, for example, generate a job offer and/or provide an estimate price. The job may take the form:

{
id: f5f4d735-62c3-447c-acd9-671c6b75dfc6,
customerId: 124e4564-6a53-41e1-9437-147834b43777,
location: {lat: 44.12, lng: 56.11, address(optional): "1234 ... "},
merchantId: a2c4bba5-5348-4481-8ef7-b34648372af6,
fieldworkerId: 5d2575ee-2fe7-4687-9b64-4c9eae307939,
serviceId: 5d2575ee-2fe7-4687-9b64-4c9eae307939,
status: TENDERED,
"price": {"estimated": {"formattedAmount": "$100", ... },
 "final": {"formattedAmount": "$130", ... },
"proposedChange": {"formattedAmount", "$140", ... }
"estimatedDuration": 3600, // seconds
requestedDateAndTimes: [{"startTime": "XYZ", "endTime": "XYZ2"}
 {"startTime": "XYZ1", "endTime":"XYZ2"},
 {"startTime": "XYZ1", "endTime": "XYZ2"}]
scheduledDateAndTime: {"startTime": "XYZ1", "endTime": "XYZ2"}
"timezone": "America/Los_Angeles",
}

Using the object above, in some embodiments, jobs may be created, read, updated, deleted, accepted, and rejected.

Once enough information has been received, the estimate price may then be calculated. Accordingly, as shown in block 660 of FIG. 6, an apparatus, such as apparatus 200, may be configured for calculating an estimated cost of the job request based on the job request parameters and subsequently, as shown in block 670 of FIG. 6, an apparatus, such as apparatus 200, may be configured for providing the estimated cost to the consumer device. For example, in an exemplary embodiment wherein the requested service is house cleaning, job request parameters may include square footage, the number of bathrooms, whether pets are present, etc. Each of the job request parameters may be utilized in calculating the estimated price. That is, in calculating an estimated price of a house cleaning, the promotion and marketing system may utilize at least one of, for example, square footage, the number of bathrooms and whether pets are present. For example, each of one or more job request parameters (e.g., location, square footage) may be compared to a database that stores an estimated cost per square foot in the consumer's location (e.g., neighborhood, town, city, or the like) to generate a first cost. Additional job request parameters may be utilized to manipulate or otherwise alter the first cost. For example, a second database may be accessed based on another job request parameter (e.g., pets), that increase or decrease the price based on factors (e.g., quantity, type, size, breed, etc.). For examples, smoking, pets, and stains may be additional job request parameters that may act as price manipulators or multipliers that increase the cost, whereas a minimal number of bathrooms or carpets may act as price manipulators or multipliers that increase the cost.

Accordingly, in some embodiments, subsequent to receiving the job request, the promotion and marketing system may be configured for calculating an estimate price based on the job request parameters. Here, the promotion and marketing system may be configured for causing transmission of the estimate prices to the consumer device and awaiting confirmation before proceeding to the identification of the one or more merchants. In some embodiments, subsequent to receiving the job request and identification of the one or more merchants able to provide the service in accordance with the job request parameters, the promotion and marketing system may be configured for calculating an estimate price based on the job request parameters and the first merchant of the subset of one or more merchants identified as able to provide the service in accordance with the job request parameters. In this example, the promotion and marketing system may be configured for then causing transmission of the estimate prices to the consumer device and awaiting confirmation before proceeding to the transmission of the job offer.

In some embodiments, the consumer (e.g., operating the consumer device) may receive the estimated price and indicate their desire to proceed. Once the price is accepted, a promotion and marketing system may identify merchant who are able to perform the requested services in accordance with the job request parameters. As shown in block 680 of FIG. 6, an apparatus, such as apparatus 200, may be configured for determining at least a first merchant, or in some embodiments, a subset of the plurality of merchants able to provide the service, at the location, within the time frame.

Merchant objects may take the form

{
  id: "a2c4bba5-5348-4481-8ef7-b34648372af6",
  email: "bob@bobsconstruction.com",
  phoneNumber: "+15551234567",
  companyName: "Bob's Construction",
  address: "123 Example Ave ... ",
  status: ACTIVE/INACTIVE
}

Merchant objects may be created using POST, read using GET, updated using PUT, deleted using DELETE, list jobs using GET, list field workers using GET, list job offers using GET.

As shown in block 690 of FIG. 6, an apparatus, such as apparatus 200, may be configured for advertising the job offer to at least a first merchant of the subset of the plurality of merchants able to provide the service, at the location, within the time frame. In some embodiments, the apparatus may instead be configured for advertising the job offer to the subset of the plurality of merchants able to provide the service, at the location, within the time frame. In some embodiments, the identification of the first merchant is determined by a predetermined score of the merchant(s), or based on a calculation of a relevance score, a quality score, or the like.

Here, in some embodiment the information provided in the advertisement of the job offer is limited to non-identifying information. For example, at this point, the city, town, and/or neighborhood of a consumer may be relevant, but merchants do not need the specific address, nor the names and/or contact information of the consumer.

The job offer object may take the form:

{
  id: f5f4d735-62c3-447c-acd9-671c6b75dfc6
  job: {..}
  merchantId: f5f4d735-62c3-447c-acd9-671c6b75dfc6,
  expiresAt: "2015-07-20T09:30:00Z"
}

Assigning a Merchant

Once the job offer is created and advertised, a merchant is able to accept the job offer and be assigned to the job. FIG.

7 illustrates a flow diagram depicting an example of a process 700 for assigning a merchant to a job in accordance with embodiments of the present invention. The process 700 may be performed by an apparatus, such as the apparatus 200 described above with respect to FIG. 2. As shown in block 705 of FIG. 7, an apparatus, such as apparatus 200, may be configured for receiving zero or more acceptances to the advertised job offer. As shown in block 710 of FIG. 7, an apparatus, such as apparatus 200, may be configured for determining if any acceptances were received. For example, any of the identified merchants that receive the job offer may determine that they are already booked or otherwise unavailable at the time and/or location of the job, and as such, may not response or decline the job offer.

In the event no acceptances are received, as shown in block 715 of FIG. 7, an apparatus, such as apparatus 200, may be configured for providing the consumer device with a notification indicating there are no available merchants able to perform the job according to the job parameters. The consumer may modify the job request parameters and re-submit. Knowledge of those job requests that are unable to be fulfilled may be useful and as such, may be logged. For example, particular location or time frames may be difficult to staff. As such, as shown in block 720 of FIG. 7, an apparatus, such as apparatus 200, may be configured for logging the job request and/or job request parameters, the log configured for use in determining particular job requests or job request parameters that are unable to be fulfilled.

In the event that at least one acceptance is received, as shown in block 725 of FIG. 7, an apparatus, such as apparatus 200, may be configured for determining which merchant of a plurality of merchants to assign the job. In some embodiments, subsequent to the transmission of the job offer, the apparatus may be configured for waiting a predefined amount of time for each of a plurality of responses. Once a plurality of responses are received, the apparatus may be configured for identifying a ranking associated with the merchant providing each of the plurality of responses, which may then factor into the assignment.

In some embodiments, instead of an acceptance, a merchant may provide a counter offer, such as for example, a different time. As shown in block 730 of FIG. 7, an apparatus, such as apparatus 200, may be configured for, in the event any terms vary, providing counter terms and awaiting acceptance or receiving a cancellation.

In some embodiments, while the consumer is still interacting with the user interface and the promotion and marketing system has identified one or more merchants able to perform the requested service, merchant relevant promotion may be provided to the consumer device. Accordingly, as shown in block 735 of FIG. 7, an apparatus, such as apparatus 200, may be configured for providing one or more merchant relevant promotions. As shown in block 740 of FIG. 7, an apparatus, such as apparatus 200, may be configured for assigning the job to the first merchant. In some embodiments, subsequent to the transmission of the job offer, assigning the job to the first merchant to respond. In some embodiments, the job status may then be updated. In some embodiments, a job may be updated
JobUpdate
{
   id: f5f4d735-62c3-447c-acd9-671c6b75dfc6
   jobId: f5f4d735-62c3-447c-acd9-671c6b75dfc6
   currentStatus:
   currentPrice:
   Note: "Job will take longer than expected"

updateStatus: OK/PENDING/APPROVED (Customer may need to approve some updates)
}

For example, using the object above, notification may be provided indicating that filed worker will be late, that a job will take longer than expected, or the like.

As shown in block 745 of FIG. 7, an apparatus, such as apparatus 200, may be configured for receiving, from the merchant device, identification information related to the field worker assigned to perform the requested service and/or tasked with performing some subset of the request service.

The field worker object may take the form
Fieldworker
{
   id: 5d2575ee-2fe7-4687-9b64-4c9eae307939,
   email: "jason@bobsconstruction.com",
   name="Jason Worker",
   phoneNumber="555-123-5555",
   backgroundCheckStatus="ACTIVE",
   merchantId=a2c4bba5-5348-4481-8ef7-b34648372af6,
}
Fieldworker Update
{
   id: f5f4d735-62c3-447c-acd9-671c6b75dfc6,
   created: 2015-07-14T10:08:15.000Z
   location: {lat: . . . , lng: ..}
   jobId: { }
   status: IN TRANSIT/STARTED/PAUSED/FINISHED
}

Using the object above, the field worker may be created using POST, read using GET, update using PUT, and deleted using delete. Moreover, the jobs associated with a particular field worker may be accessed using GET.

As shown in block 750 of FIG. 7, an apparatus, such as apparatus 200, may be configured for providing information indicative of the identity of the merchant and field worker to the consumer device.

Job Completion and Payment

FIG. 8 illustrates a flow diagram depicting an example of a process 800 for enabling communication between the promotion and marketing system, the merchant device, the consumer device and the field worker device in accordance with embodiments of the present invention. The process illustrates how, upon assignment of a merchant to the job, communication is enabled such that the field worker can provide updates on the status of the job. The process 800 may be performed by an apparatus, such as the apparatus 200 described above with respect to FIG. 2.

As shown in block 810 of FIG. 8, an apparatus, such as apparatus 200, may be configured for receive one or more notifications from the field worker device, the notifications indicative of updates to the status of the job. For example, notifications may be provided when the job is scheduled, when the field worker is on the way to the location. In some embodiments, such as for example, when the requested job is comprised of two or more discrete tasks, notifications may be provided as each task is being performed and/or completed. In some embodiments, the notifications may comprise text information, picture information, audio information, and/or video information.

A notification, in some embodiments, may take the form:
{
   id: f5f4d735-62c3-447c-acd9-671c6b75dfc6,
   createdTime: 2015-07-14T10:08:15Z deliveredTime: 2015-07-14T10:09:15Z
destinationId: 5d2575ee-2fe7-4687-9b64-4c9eae307939,
destinationType: Merchant/Fieldworker/Consumer
status: PENDING/POSTED,
subject: " ",
shortMessage: " ",
detailedMessage: " "
}

As shown in block 820 of FIG. 8, an apparatus, such as apparatus 200, may be configured for providing the notifications, status updates or the like to the consumer device. Additionally or alternatively, the apparatus may be configured for allowing the consumer device to access the promotion and marketing system to see updates, for example, at their convenience.

Job status may include:

| Value | Description |
|---|---|
| PRE_TENDER | The job has been received by the system but has not been advertised to merchant. |
| TENDERED | The job has been advertised to merchants |
| SCHEDULED | A Merchant has accepted the job |
| PERFORMED | The work has been performed |
| PRE_SETTLED | We are waiting on payment |
| SETTLED | The job has been paid for |
| DISPUTE | Payment is disputed |
| NOTIFYING MERCHANT_CANCELATION | The customer has cancelled the job |
| NOTIFYING CONSUMER_NO_AVAILABILITY | The customer has been told that there were no available merchants. |

In some embodiments, notifications may be provided in accordance with user preferences. User preferences may be stored by the promotion and marketing system as a table. For example,

| Destination | shortMessage Present | Subject + LongMessage Present |
|---|---|---|
| Fieldworker | An sms will be sent with the short message A notification will be sent with the short message | an email will be sent with the subject and long message. |
| Merchant | An sms will be sent with the short message | an email will be sent with the subject and long message |
| Consumer | An sms will be sent with the short message | an email will be sent with the subject and long message |

As shown in block 830 of FIG. 8, an apparatus, such as apparatus 200, may be configured for monitoring notifications and/or status updates to determine if the job is complete. In the event, the job is complete, as shown in block 840 of FIG. 8, an apparatus, such as apparatus 200, may be configured for provide a notification indicative of completion. In some embodiments, the promotion and marketing system may be configured for receiving a notice of completion from the field worker device, and in an instance in which completion is confirmed via visual inspection, receiving image data indicative of completion. For example, if in the job request a stain (e.g., a carpet stain or furniture stain) is indicated, a visual inspection or visual confirmation may be necessary to confirm the job is complete. The promotion and marketing system may be configured for causing examination of the image data to confirm completion and providing the notice of completion to the consumer device. For example, the promotion and marketing system may be configured for comparing a picture of the stain (provided by the consumer device) with a picture of the location of the stain, the stain having been removed at least in part (provided by the field worker device), and determining whether the stain removal was completed by analyzing the image for the stain and verifying completeness.

Subsequent to confirming completion, payment may be requested. As shown in block 850 of FIG. 8, an apparatus, such as apparatus 200, may be configured for requesting payment. In some embodiments, in addition to requesting payment, the apparatus may be configured for requesting feedback on the performance of one or both of the merchant and field workers.

As shown in block 860 of FIG. 8, an apparatus, such as apparatus 200, may be configured for awaiting payment, awaiting feedback, awaiting dispute, or the like. As shown in block 870 of FIG. 8, an apparatus, such as apparatus 200, may be configured for receiving payment. In some embodiments, feedback or a dispute may also or alternatively be received. As shown in block 880 of FIG. 8, an apparatus, such as apparatus 200, may be configured for providing variable compensation to the first merchant and the one more field workers, the variable compensation being a portion of the payment, the portion being dependent on the feedback.

As will be appreciated, computer program code and/or other instructions may be loaded onto a computer, processor or other programmable apparatus's circuitry to produce a machine, such that execution of the code on the machine by the computer, processor, or other circuitry creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Promotion and Marketing System

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limit one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a promotion and marketing service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in store only, or that the promotion must be used by a certain date.

As used herein, the term "promotion content" refers to display factors or features that influence how the promotion is displayed to consumers. For example, promotion content may include an image associated with the promotion, a narrative description of the promotion or the merchant, a display template for association with the promotion, or the like. For example, merchant self-service indicators (defined below) may be used to identify promotion offers that were generated by merchants with similar characteristics to the merchant self-service indicators. Various other factors may be used to generate the promotion offer, such as the success of the promotion offers generated by the merchants with similar characteristics, the product availability of the merchant, and the like.

As used herein, the term "promotion component" is used to refer to elements of a particular promotion that may be selected during a promotion generation process. Promotion components may include any aspect of a promotion, including but not necessarily limited to offering parameters, redemption parameters, and promotion content. For example, promotion components may include, but are not limited to, promotion titles, promotion ledes (e.g., a short text phrase displayed under a promotion title), promotion images, promotion prices, promotion discount levels, promotion style sheets, promotion fonts, promotion e-mail subjects, promotion quantities, promotion fine print options, promotion fees assessed to the merchant by the promotion and marketing service, or the like. Promotion components may also include various flags and settings associated with registration and verification functions for a merchant offering the promotion, such as whether the identity of the merchant has been verified, whether the merchant is registered with the promotion and marketing service, or the like.

As used herein, the term "electronic marketing communication" refers to any electronically generated information content provided by the promotion and marketing service to a consumer for the purpose of marketing a promotion, good, or service to the consumer. Electronic marketing communications may include any email, short message service (SMS) message, web page, application interface, or the like electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, the term "business analytic data" refers to data generated by the promotion and marketing service based on electronic marketing information to assist with the operation of the promotion and marketing service and/or one or more merchants. The various streams of electronic marketing information provided to and by the promotion and marketing service allow for the use of sophisticated data analysis techniques that may be employed to identify correlations, relationships, and other associations among elements of electronic marketing information. These associations may be processed and formatted by the promotion and marketing service to provide reports, recommendations, and services both internal to the promotion and marketing service and to merchants in order to improve the process by which merchants and promotion and marketing service engage with consumers. For example, the promotion and marketing service may analyze the electronic marketing information to identify an increased demand for a particular product or service, and provide an electronic report to a merchant suggesting the merchant offer the particular product or service. Alternatively, the promotion and marketing service may identify that a particular product or service is not selling well or that sales of the product or service result in the merchant losing money, customers, or market share (e.g., after consumers order a particular menu item, they never come back to the merchant), and suggest that the merchant should discontinue offering that product or service.

It should be appreciated that the term "business analytic data" is intended to refer to electronically and programmatically generated data. For example, a printed report or letter manually drafted by an employee of the promotion and marketing service would not be said to include business analytic data, even if said data was used by the employee during the drafting process, while a data disk or downloaded file containing analytics generated by the promotion and marketing service would be considered business analytic data.

Merchants, including manufacturers, wholesalers, and retailers, have spent a tremendous amount of time, money, manpower, and other resources to determine the best way to market their products to consumers. Whether a given marketing effort is successful is often determined based on the return-on-investment offered to the merchant from increased awareness, sales, and the like of the merchant's goods and services in exchange for the resources spent on the marketing effort. In other words, optimal marketing techniques generally maximize the benefit to the merchant's bottom line while minimizing the cost spent on marketing. To this end, a merchant's marketing budget may be spent in a variety of different manners including advertising, offering of discounts, conducting market research, and various other known marketing techniques. The end goal of these activities is to ensure that products are presented to consumers in a manner that maximizes the likelihood that the consumers will purchase the product from the merchant that performed the marketing activities while minimizing the expense of the marketing effort.

The advent of electronic commerce has revolutionized the marketing process. While merchants would typically have to perform costly market research such as focus groups, surveys, and the like to obtain detailed information on consumer preferences and demographics, the digital age has provided a wealth of new consumer information that may be used to optimize the marketing and sales process. As a result, new technologies have been developed to gather, aggregate, analyze, and report information from a variety of electronic sources.

So-called "clickstream data" provides a robust set of information describing the various interactions consumers have with electronic marketing information provided to them by merchants and others. Promotion and marketing services have been developed with sophisticated technology to receive and process this data for the benefit of both merchants and consumers. These services assist merchants with marketing their products to interested consumers, while reducing the chance that a consumer will be presented with marketing information in which the consumer has no interest. Some promotion and marketing services further leverage their access to the trove of electronic marketing information to assist merchants and consumers with other tasks, such as offering improved merchant point-of-sale systems, improved inventory and supply chain management, improved methods for delivering products and services, and the like.

Unlike conventional marketing techniques related to the use of paper or other physical media (e.g., coupons clipped from a weekly newspaper), promotion and marketing services offer a wealth of additional electronic solutions to improve the experience for consumers and merchants. The ability to closely monitor user impressions provides the ability for the promotion and marketing service to gather data related to the time, place, and manner in which the consumer engaged with the impression (e.g., viewed, clicked, moused-over) and obtained and redeemed the promotion. The promotion and marketing service may use this information to determine which products and services are most relevant to the consumer's interest, and to provide marketing materials related to said products and services to the consumer, thus improving the quality of the electronic marketing communications received by the consumer. Merchants may be provided with the ability to dynamically monitor and adjust the parameters of promotions offered by the promotion and marketing service, ensuring that the merchant receives a positive return on their investment. For example, the merchant can closely monitor the type, discount level, and quantity sold of a particular promotion on the fly, while with traditional printed coupons the merchant would not be able to make any changes to the promotion after the coupon has gone to print. Each of these advancements in digital market and promotion distribution involve problems unique to the digital environment not before seen in traditional print or television broadcast marketing.

However, these promotion and marketing services are not without problems. Although the clickstream data provides a wealth of information, the inventors have determined that existing techniques may not always leverage this information in an efficient or accurate manner. Technology continues to rapidly advance in the field of analytics and the processing of this information, offering improved data gathering and analysis techniques, resulting in more relevant and accurate results provided in a more efficient manner. Electronic marketing services continue to evolve and provide improved methods for engaging consumers and spreading awareness of products offered by promotion and marketing services.

In many cases, the inventors have determined that these services are constrained by technological obstacles unique to the electronic nature of the services provided, such as constraints on data storage, machine communication and processor resources. The inventors have identified that the wealth of electronic data available to these services and the robust nature of electronic marketing communications techniques present new challenges never contemplated in the world of paper coupons and physical marketing techniques. The inventors have further determined that even technological methods that leverage computers for statistical analysis and consumer behavior modeling (e.g., television rating systems) fail to address problems associated with providing relevant, high quality electronic marketing communications (e.g., impressions) to consumers in a manner that maximizes accuracy, minimizes error, is user friendly and provides for efficient allocation of resources. Embodiments of the present invention as described herein serve to correct these errors and offer improved resource utilization, thus providing improvements to electronic marketing services that address problems arising out of the electronic nature of those services.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for programmatically providing a platform for requesting on-demand services on a consumer device, the method comprising:

providing, by a server, initially, a user interface to the consumer device configured for display on the consumer device, enabling user input indicative of a selection of a specific category from among a plurality of categories, to which a job request is associated;

receiving, by the server, information indicative of the job request, at the user interface, the information indicative of the job request indicative of a job to be performed for a consumer, the information indicative of the job request comprising job request parameters, the job request parameters comprising at least a type of service, a location, and a time frame within which the job is to be performed;

updating, by the server, the user interface, depending on the received information indicative of the job request parameters, to display additional job request parameters, configured for selection, wherein the additional job request parameters, configured for selection, are dependent on the job request parameters received at the user interface, including the type of service, the location, and the time frame within which the job is to be performed;

receiving, subsequently, by the server via an updated user interface, one or more selections indicative of the additional job request parameters;

identifying, by the server, one or more merchants able to provide the service in accordance with the job request parameters and the additional job request parameters, the identification of the one or more merchants including:

accessing a merchant database, the merchant database including information related to each of a plurality of merchants; and determining a subset of the plurality of merchants able to provide the service, at the location, within the time frame;

causing transmission, by the server, of a job offer to at least a first merchant of the subset of one or more merchants identified as able to provide the service in accordance with the job request parameters and the additional job request parameters;

receiving, by the server, at least one response, the at least one response from the first merchant from the one or more merchants;

providing, by the server, notification to the first merchant, the notification indicative of the assignment of the job;

receiving, by the server, field worker information identifying the field worker tasked with completing the job in accordance with the job request parameters and the additional job request parameters, including at least the type of service, the location, and the time frame within which the job is to be performed from the first merchant, the field worker information indicative of at least one field worker associated with a field worker device;

receiving, by the server, a notice of completion and image data indicative of completion from the field worker device;

causing, by the server, examination of the image data to confirm completion; and providing, by the server, the notice of completion and the image data to the consumer device based on the examination of the image data and the confirmation of completion.

2. The method according to claim 1, further comprising:
causing transmission of the job offer to the subset of one or more merchants identified as able to provide the service in accordance with the job request parameters and the additional job request parameters;
subsequent to the transmission of the job offer, awaiting a predefined amount of time for each of a plurality of responses; and
identifying a ranking associated with the merchant providing each of the plurality of responses, wherein the first merchant is the merchant having the highest ranking.

3. The method according to claim 1, further comprising:
causing transmission of the job offer to the subset of one or more merchants identified as able to provide the service in accordance with the job request parameters and the additional job request parameters; and
subsequent to the transmission of the job offer, assigning the job to the first merchant to respond.

4. The method according to claim 1, further comprising:
causing identification, to the consumer device, of the merchant and the one or more field workers.

5. The method according to claim 1, further comprising:
enabling communication directly to the field worker device, the field worker device operated by at least one of the one or more field workers tasked with completing the job,
wherein the enabled communication allowing the field worker device to transmit job-related information and job-related updates.

6. The method according to claim 1, further comprising:
receiving a notice of completion from the field worker device;
providing the notice of completion to the consumer device;
requesting a payment;
receiving payment and feedback information, the feedback information related to a performance of the first merchant and the one or more field workers; and
providing variable compensation to the first merchant and the one more field workers, the variable compensation being a portion of the payment, the portion being dependent on the feedback.

7. The method according to claim 1, further comprising:
subsequent to receiving the job request, calculating an estimate price based on the job request parameters;
causing transmission of the estimate prices to the consumer device; and
awaiting confirmation before proceeding to the identification of the one or more merchants.

8. The method according to claim 1, further comprising:
subsequent to receiving the job request and identification of the one or more merchants able to provide the service in accordance with the job request parameters, calculating an estimate price based on the job request parameters and the first merchant of the subset of one or more merchants identified as able to provide the service in accordance with the job request parameters; and
causing transmission of the estimate prices to the consumer device; and
awaiting confirmation before proceeding to the transmission of the job offer.

9. The method according to claim 1, wherein the identification of the of the one or more merchants further comprises:
preceding the determination of the subset of the plurality of merchants able to provide the service, at the location, within the time frame, calculating a relevance score for each of the one or more merchants; and
identifying at least the first merchant, the first merchant having a highest relevance score.

10. An apparatus comprising at least one processor and at least one memory including computer program code, the at least one memory and the computer program code configured to, with the processor, cause the apparatus to at least:
provide, by a server, initially, a user interface to the consumer device configured for display on the consumer device, enabling user input indicative of a selection of a specific category from among a plurality of categories, to which a job request is associated;
receive, by the server, information indicative of the job request, at the user interface, the information indicative of the job request indicative a job to be performed for a consumer, the job request comprising of job request parameters, the job request parameters comprising at least a type of service, a location, and a time frame within which the job is to be performed;
update, by the server, the user interface, depending on the received information indicative of the job request parameters, to display additional job request parameters, configured for selection, wherein the additional job request parameters, configured for selection, are dependent on the job request parameters received at the user interface, including the type of service, the location, and the time frame within which the job is to be performed;
receive, subsequently, by the server via an updated user interface, one or more selections indicative of the additional job request parameters
identify, by the server, one or more merchants able to provide the service in accordance with the job request parameters and the additional job request parameters, the identification of the one or more merchants including:
accessing a merchant database, the merchant database including information related to each of a plurality of merchants; and
determining a subset of the plurality of merchants able to provide the service, at the location, within the time frame;
cause transmission, by the server, of a job offer to at least a first merchant of the subset of one or more merchants identified as able to provide the service in accordance with the job request parameters and the additional job request parameters;
receive, by the server, at least one response, the at least one response from the first merchant from the one or more merchants;
provide, by the server, notification to the first merchant, the notification indicative of the assignment of the job;
receive, by the server, field worker information identifying the field worker tasked with completing the job in accordance with the job request parameters and the additional job request parameters, including at least the type of service, the location, and the time frame within which the job is to be performed from the first merchant, the field worker information indicative of at least one field worker associated with a field worker device;
receive, by the server, a notice of completion and image data indicative of completion from the field worker device;
cause, by the server, examination of the image data to confirm completion; and
provide, by the server, the notice of completion and the image data to the consumer device based on the examination of the image data and the confirmation of completion.

11. The apparatus according to claim 10, wherein the at least one memory and the computer program code are further configured to, with the processor, cause the apparatus to:
cause transmission of the job offer to the subset of one or more merchants identified as able to provide the service in accordance with the job request parameters and the additional job request parameters;
subsequent to the transmission of the job offer, await a predefined amount of time for each of a plurality of responses; and
identify a ranking associated with the merchant providing each of the plurality of responses, wherein the first merchant is the merchant having the highest ranking.

12. The apparatus according to claim 10, wherein the at least one memory and the computer program code are further configured to, with the processor, cause the apparatus to:
cause transmission of the job offer to the subset of one or more merchants identified as able to provide the service in accordance with the job request parameters; and
subsequent to the transmission of the job offer, assign the job to the first merchant to respond.

13. The apparatus according to claim 10, wherein the at least one memory and the computer program code are further configured to, with the processor, cause the apparatus to:
cause identification, to the consumer device, of the merchant and the one or more field workers.

14. The apparatus according to claim 10, wherein the at least one memory and the computer program code are further configured to, with the processor, cause the apparatus to:
enable communication directly to the field worker device, the field worker device operated by at least one of the one or more field workers tasked with completing the job,
wherein the enabled communication allowing the field worker device to transmit job-related information and job-related updates.

15. The apparatus according to claim 10, wherein the at least one memory and the computer program code are further configured to, with the processor, cause the apparatus to:
receive a notice of completion from the field worker device;
provide the notice of completion to the consumer device;
request a payment;
receive payment and feedback information, the feedback information related to a performance of the first merchant and the one or more field workers; and
provide variable compensation to the first merchant and the one more field workers, the variable compensation being a portion of the payment, the portion being dependent on the feedback.

16. The apparatus according to claim 10, wherein the at least one memory and the computer program code are further configured to, with the processor, cause the apparatus to:
subsequent to receiving the job request, calculating an estimate price based on the job request parameters;
cause transmission of the estimate prices to the consumer device; and
await confirmation before proceeding to the identification of the one or more merchants.

17. The apparatus according to claim 10, wherein the at least one memory and the computer program code are further configured to, with the processor, cause the apparatus to:
subsequent to receiving the job request and identification of the one or more merchants able to provide the service in accordance with the job request parameters, calculate an estimate price based on the job request parameters and the first merchant of the subset of one or more merchants identified as able to provide the service in accordance with the job request parameters; and
cause transmission of the estimate prices to the consumer device; and
await confirmation before proceeding to the transmission of the job offer.

18. The apparatus according to claim 10, wherein the identification of the of the one or more merchants further comprises:
preceding the determination of the subset of the plurality of merchants able to provide the service, at the location, within the time frame, calculate a relevance score for each of the one or more merchants; and
identify at least the first merchant, the first merchant having a highest relevance score.

19. A computer program product for programmatically providing a platform for requesting on-demand services on a consumer device, the computer program product comprising at least one non-transitory computer-readable storage medium having computer-executable program code instructions stored therein, the computer-executable program code instructions comprising program code instructions for:
providing, by a server, initially, a user interface to the consumer device configured for display on the consumer device, enabling user input indicative of a selection of a specific category from among a plurality of categories, to which a job request is associated;

receiving, by the server, information indicative of the job request, at the user interface, the information indicative of the job request indicative of a job to be performed for a consumer, the information indicative of the job request comprising job request parameters, the job request parameters comprising at least a type of service, a location, and a time frame within which the job is to be performed;

updating, by the server, the user interface, depending on the received information indicative of the job request parameters, to display additional job request parameters, configured for selection, wherein the additional job request parameters, configured for selection, are dependent on the job request parameters received at the user interface, including the type of service, the location, and the time frame within which the job is to be performed;

receiving, subsequently, by the server via an updated user interface, one or more selections indicative of the additional job request parameters;

identifying, by the server, one or more merchants able to provide the service in accordance with the job request parameters and the additional job request parameters, the identification of the one or more merchants including:

accessing a merchant database, the merchant database including information related to each of a plurality of merchants; and determining a subset of the plurality of merchants able to provide the service, at the location, within the time frame;

causing transmission, by the server, of a job offer to at least a first merchant of the subset of one or more merchants identified as able to provide the service in accordance with the job request parameters and the additional job request parameters;

receiving, by the server, at least one response, the at least one response from the first merchant from the one or more merchants;

providing, by the server, notification to the first merchant, the notification indicative of the assignment of the job;

receiving, by the server, field worker information identifying the field worker tasked with completing the job in accordance with the job request parameters and the additional job request parameters, including at least the type of service, the location, and the time frame within which the job is to be performed from the first merchant, the field worker information indicative of at least one field worker associated with a field worker;

receiving, by the server, a notice of completion and image data indicative of completion from the field worker device;

causing, by the server, examination of the image data to confirm completion; and providing, by the server, the notice of completion and the image data to the consumer device based on the examination of the image data and the confirmation of completion.

20. The computer program product according to claim 19, wherein the computer-executable program code instructions further comprise program code instructions for:

causing transmission of the job offer to the subset of one or more merchants identified as able to provide the service in accordance with the job request parameters;

subsequent to the transmission of the job offer, awaiting a predefined amount of time for each of a plurality of responses; and identifying a ranking associated with the merchant providing each of the plurality of responses, wherein the first merchant is the merchant having the highest ranking.

21. The computer program product according to claim 20, wherein the computer-executable program code instructions further comprise program code instructions for:

causing transmission of a job offer to the subset of one or more merchants identified as able to provide the service in accordance with the job request parameters; and subsequent to the transmission of the job offer, assigning the job to the first merchant to respond.

22. The computer program product according to claim 19, wherein the computer-executable program code instructions further comprise program code instructions for:

causing identification, to the consumer device, of the merchant and the one or more field workers.

23. The computer program product according to claim 19, wherein the computer-executable program code instructions further comprise program code instructions for:

enabling communication directly to the field worker device, the field worker device operated by at least one of the one or more field workers tasked with completing the job, wherein the enabled communication allowing the field worker device to transmit job-related information and job-related updates.

24. The computer program product according to claim 19, wherein the computer-executable program code instructions further comprise program code instructions for:

receiving a notice of completion from the field worker device;

providing the notice of completion to the consumer device;

requesting a payment;

receiving payment and feedback information, the feedback information related to a performance of the first merchant and the one or more field workers; and providing variable compensation to the first merchant and the one more field workers, the variable compensation being a portion of the payment, the portion being dependent on the feedback.

25. The computer program product according to claim 19, wherein the computer-executable program code instructions further comprise program code instructions for:

subsequent to receiving the job request, calculating an estimate price based on the job request parameters;

causing transmission of the estimate prices to the consumer device; and awaiting confirmation before proceeding to the identification of the one or more merchants.

26. The computer program product according to claim 19, wherein the computer-executable program code instructions further comprise program code instructions for:

subsequent to receiving the job request and identification of the one or more merchants able to provide the service in accordance with the job request parameters, calculating an estimate price based on the job request parameters and the first merchant of the subset of one or more merchants identified as able to provide the service in accordance with the job request parameters; and causing transmission of the estimate prices to the consumer device; and awaiting confirmation before proceeding to the transmission of the job offer.

27. The computer program product according to claim 19, wherein the computer-executable program code instructions further comprise program code instructions for:
preceding the determination of the subset of the plurality of merchants able to provide the service, at the location, within the time frame, calculating a relevance score for each of the one or more merchants; and
identifying at least the first merchant, the first merchant having a highest relevance score.

* * * * *